(12) United States Patent
Perez

(10) Patent No.: US 10,349,100 B2
(45) Date of Patent: Jul. 9, 2019

(54) METHOD FOR ADDRESSING ON-DEMAND TV PROGRAM CONTENT ON TV SERVICES PLATFORM OF A DIGITAL TV SERVICES PROVIDER

(71) Applicant: Broadband iTV, Inc., Honolulu, HI (US)

(72) Inventor: Milton Diaz Perez, Tiburon, CA (US)

(73) Assignee: Broadband iTV, Inc., Honolulu, HI (US)

( * ) Notice: Subject to any disclaimer, the term of this patent is extended or adjusted under 35 U.S.C. 154(b) by 71 days.

(21) Appl. No.: 14/827,129

(22) Filed: Aug. 14, 2015

(65) Prior Publication Data

US 2015/0358649 A1   Dec. 10, 2015

Related U.S. Application Data

(60) Continuation of application No. 12/632,745, filed on Dec. 7, 2009, now Pat. No. 9,113,228, which is a
(Continued)

(51) Int. Cl.
*H04N 7/173* (2011.01)
*H04N 21/239* (2011.01)
(Continued)

(52) U.S. Cl.
CPC ........... *H04N 21/239* (2013.01); *G06Q 30/02* (2013.01); *H04N 7/17318* (2013.01);
(Continued)

(58) Field of Classification Search
USPC .................................................. 725/74–134
See application file for complete search history.

(56) References Cited

U.S. PATENT DOCUMENTS 4,706,121 A   11/1987   Young
4,751,578 A   6/1988   Reiter et al.
(Continued)

FOREIGN PATENT DOCUMENTS

EP   1 164 796 A1   12/2001
EP   1 361 759 A1   11/2003
(Continued)

OTHER PUBLICATIONS

PTAB Decision Denying Institution of Covered Business Method Patent Review, Apr. 1, 2015, CBM2014-00189, *Hawaiian Telcom, Inc. v. Broadband iTV, Inc.*, re U.S. Pat. No. 7,631,336.
(Continued)

*Primary Examiner* — Mushfikh I Alam
(74) *Attorney, Agent, or Firm* — Amster, Rothstein & Ebenstein LLP

(57) ABSTRACT

Video content is uploaded via the Internet to a video-on-demand (VOD) server identified by a title and a hierarchical address of categories and subcategories for categorizing the title. The VOD server converts and stores the video content at a storage address in a video content database linked to the title. The title is listed in a location of an electronic program guide (EPG) using the same categories and subcategories as in its hierarchical address. Any TV subscriber can access the EPG and navigate through its categories and subcategories to find a title for viewing on the TV. This can enable many, new blogging or podcasting-like programs by popular "Hosts" to be self-published on the Internet and readily navigated for display on TV. The EPG can also store TV program addresses as bookmarks and allow them to be shared with other subscribers or with friends and contacts online by sending to their email addresses.

8 Claims, 13 Drawing Sheets

VOD Content Delivery System, Overall Architecture

Drill Down Navigation Example

Related U.S. Application Data division of application No. 11/685,188, filed on Mar. 12, 2007, now Pat. No. 7,631,336.

(51) Int. Cl.

| | | |
|---|---|---|
| *H04N 21/222* | (2011.01) | |
| *H04N 21/482* | (2011.01) | |
| *H04N 21/462* | (2011.01) | |
| *H04N 21/472* | (2011.01) | |
| *H04N 21/8545* | (2011.01) | |
| *H04N 21/61* | (2011.01) | |
| *H04N 21/258* | (2011.01) | |
| *H04N 21/414* | (2011.01) | |
| *H04N 21/475* | (2011.01) | |
| *G06Q 30/02* | (2012.01) | |
| *H04N 21/2547* | (2011.01) | |
| *H04N 21/4722* | (2011.01) | |
| *H04N 21/81* | (2011.01) | |
| *H04N 21/262* | (2011.01) | |
| *H04N 21/2665* | (2011.01) | |
| *H04N 21/643* | (2011.01) | |
| *H04N 21/431* | (2011.01) | |
| *H04N 21/434* | (2011.01) | |
| *H04N 21/6379* | (2011.01) | |
| *H04N 21/84* | (2011.01) | |
| *H04N 21/854* | (2011.01) | |
| *H04N 21/4786* | (2011.01) | |

(52) U.S. Cl.
CPC ....... *H04N 21/222* (2013.01); *H04N 21/2393* (2013.01); *H04N 21/2547* (2013.01); *H04N 21/25875* (2013.01); *H04N 21/25891* (2013.01); *H04N 21/2665* (2013.01); *H04N 21/26291* (2013.01); *H04N 21/41407* (2013.01); *H04N 21/4312* (2013.01); *H04N 21/4345* (2013.01); *H04N 21/4622* (2013.01); *H04N 21/4722* (2013.01); *H04N 21/4753* (2013.01); *H04N 21/4758* (2013.01); *H04N 21/4786* (2013.01); *H04N 21/47202* (2013.01); *H04N 21/47214* (2013.01); *H04N 21/482* (2013.01); *H04N 21/4821* (2013.01); *H04N 21/4823* (2013.01); *H04N 21/4825* (2013.01); *H04N 21/6125* (2013.01); *H04N 21/6175* (2013.01); *H04N 21/6379* (2013.01); *H04N 21/64322* (2013.01); *H04N 21/812* (2013.01); *H04N 21/8186* (2013.01); *H04N 21/84* (2013.01); *H04N 21/8545* (2013.01); *H04N 21/85406* (2013.01)

(56) References Cited

U.S. PATENT DOCUMENTS

| | | |
|---|---|---|
| 5,479,268 A | 12/1995 | Young et al. |
| 5,485,219 A | 1/1996 | Woo |
| 5,550,735 A | 8/1996 | Slade et al. |
| 5,559,549 A | 9/1996 | Hendricks et al. |
| 5,566,287 A | 10/1996 | Delpuch |
| 5,589,892 A | 12/1996 | Knee et al. |
| 5,592,551 A | 1/1997 | Lett et al. |
| 5,594,936 A | 1/1997 | Rebec et al. |
| 5,616,876 A | 4/1997 | Cluts |
| 5,648,824 A | 7/1997 | Dunn et al. |
| 5,670,730 A | 9/1997 | Grewe et al. |
| 5,686,954 A | 11/1997 | Yoshinobu et al. |
| 5,689,799 A | 11/1997 | Dougherty et al. |
| 5,699,125 A | 12/1997 | Rzeszewski et al. |
| 5,701,161 A | 12/1997 | Williams et al. |
| 5,721,827 A | 2/1998 | Logan et al. |
| 5,734,853 A | 3/1998 | Hendricks et al. |
| 5,739,451 A | 4/1998 | Winksy et al. |
| 5,758,258 A | 5/1998 | Shoff et al. |
| 5,759,101 A | 6/1998 | Von Kohorn |
| 5,778,181 A | 7/1998 | Hidary et al. |
| 5,790,176 A | 8/1998 | Craig |
| 5,790,935 A | 8/1998 | Payton |
| 5,798,785 A | 8/1998 | Hendricks et al. |
| 5,798,921 A | 8/1998 | Johnson et al. |
| 5,805,763 A | 9/1998 | Lawler et al. |
| 5,812,123 A | 9/1998 | Rowe et al. |
| 5,813,014 A | 9/1998 | Gustman |
| 5,822,123 A | 10/1998 | Davis et al. |
| 5,826,102 A | 10/1998 | Escobar |
| 5,832,499 A | 11/1998 | Gustman |
| 5,850,218 A | 12/1998 | LaJoie et al. |
| 5,859,898 A | 1/1999 | Checco |
| 5,867,821 A | 2/1999 | Ballantyne |
| 5,884,033 A | 3/1999 | Duvall et al. |
| 5,892,536 A | 4/1999 | Logan et al. |
| 5,914,746 A | 6/1999 | Matthews |
| 5,918,303 A | 6/1999 | Yamaura et al. |
| 5,926,230 A | 7/1999 | Niijima et al. |
| 5,931,901 A | 8/1999 | Wolfe |
| 5,956,716 A | 9/1999 | Kenner et al. |
| 5,969,283 A | 10/1999 | Looney et al. |
| 5,991,801 A | 11/1999 | Rebec et al. |
| 6,005,561 A | 12/1999 | Hawkins et al. |
| 6,008,803 A | 12/1999 | Rowe et al. |
| 6,018,768 A | 1/2000 | Ullman et al. |
| 6,025,837 A | 2/2000 | Matthews et al. |
| 6,029,045 A | 2/2000 | Picco et al. |
| 6,038,591 A | 3/2000 | Wolfe |
| 6,049,823 A | 4/2000 | Hwang |
| 6,062,868 A | 5/2000 | Toriumi |
| 6,088,455 A | 7/2000 | Logan et al. |
| 6,092,080 A | 7/2000 | Gustman |
| 6,100,883 A | 8/2000 | Hoarty |
| 6,118,442 A | 9/2000 | Tanigawa |
| 6,118,450 A | 9/2000 | Proehl et al. |
| 6,128,012 A | 10/2000 | Seidensticker, Jr. et al. |
| 6,148,081 A | 11/2000 | Szymanski et al. |
| 6,161,142 A | 12/2000 | Wolfe |
| 6,163,316 A | 12/2000 | Killian |
| 6,172,677 B1 | 1/2001 | Stautner et al. |
| 6,177,931 B1 | 1/2001 | Alexander et al. |
| 6,201,538 B1 | 3/2001 | Wugofski |
| 6,205,582 B1 | 3/2001 | Hoarty |
| 6,208,799 B1 | 3/2001 | Marsh et al. |
| 6,233,736 B1 | 5/2001 | Wolzien |
| 6,237,146 B1 | 5/2001 | Richards |
| 6,248,946 B1 | 6/2001 | Dwek |
| 6,269,275 B1 | 7/2001 | Slade |
| 6,289,346 B1 | 9/2001 | Milewski et al. |
| 6,305,016 B1 | 10/2001 | Marshall et al. |
| 6,317,885 B1 | 11/2001 | Fries |
| 6,332,175 B1 | 12/2001 | Birrell et al. |
| 6,357,042 B2 | 3/2002 | Srinivasan |
| 6,377,530 B1 | 4/2002 | Burrows |
| 6,418,556 B1 | 7/2002 | Bennington et al. |
| 6,445,398 B1 | 9/2002 | Gerba et al. |
| 6,446,083 B1 | 9/2002 | Leight et al. |
| 6,476,826 B1 | 11/2002 | Plotkin et al. |
| 6,539,548 B1 | 3/2003 | Hendricks et al. |
| 6,546,393 B1 | 4/2003 | Khan |
| 6,564,380 B1 | 5/2003 | Murphy |
| 6,606,746 B1 | 8/2003 | Zdepski et al. |
| 6,678,463 B1 | 1/2004 | Pierre et al. |
| 6,738,978 B1 | 5/2004 | Hendricks |
| 6,754,904 B1 | 6/2004 | Cooper et al. |
| 6,760,721 B1 | 7/2004 | Chasen et al. |
| 6,766,100 B1 | 7/2004 | Komar et al. |
| 6,772,433 B1 | 8/2004 | LaJoie et al. |
| 6,774,926 B1 | 8/2004 | Ellis et al. |
| 6,804,825 B1 | 10/2004 | White et al. |
| 6,834,110 B1 | 12/2004 | Marconcini et al. |
| 6,845,396 B1 | 1/2005 | Kanojia et al. |
| 6,898,762 B2 | 5/2005 | Ellis et al. |
| 6,910,191 B2 | 6/2005 | Segerberg et al. |

(56) References Cited

U.S. PATENT DOCUMENTS

| | | |
|---|---|---|
| 6,928,433 B2 | 8/2005 | Goodman et al. |
| 6,931,451 B1 | 8/2005 | Logan et al. |
| 6,968,364 B1 | 11/2005 | Wong et al. |
| 6,976,229 B1 | 12/2005 | Balabanovic et al. |
| 6,985,586 B2 | 1/2006 | Hill |
| 6,990,677 B1 | 1/2006 | Pietraszak et al. |
| 7,020,888 B2 | 3/2006 | Reynolds et al. |
| 7,028,327 B1 | 4/2006 | Dougherty et al. |
| 7,047,411 B1 | 5/2006 | DeMello et al. |
| 7,055,166 B1 | 5/2006 | Logan et al. |
| 7,055,169 B2 | 5/2006 | Delpuch et al. |
| 7,058,223 B2 | 6/2006 | Cox |
| 7,065,709 B2 | 6/2006 | Ellis |
| 7,076,734 B2 | 7/2006 | Wolff et al. |
| 7,089,309 B2 | 8/2006 | Ramaley et al. |
| 7,100,185 B2 | 8/2006 | Bennington et al. |
| 7,103,905 B2 | 9/2006 | Novak |
| 7,103,906 B1 | 9/2006 | Katz et al. |
| 7,120,925 B2 | 10/2006 | D'Souza et al. |
| 7,127,735 B1 | 10/2006 | Lee et al. |
| 7,155,674 B2 | 12/2006 | Breen et al. |
| 7,200,575 B2 | 4/2007 | Hans et al. |
| 7,213,005 B2 | 5/2007 | Mourad et al. |
| 7,222,163 B1 | 5/2007 | Girouard et al. |
| 7,225,455 B2 | 5/2007 | Bennington et al. |
| 7,243,139 B2 | 7/2007 | Ullman et al. |
| 7,269,854 B2 | 9/2007 | Simmons et al. |
| 7,277,870 B2 | 10/2007 | Mourad et al. |
| 7,305,691 B2 | 12/2007 | Cristofalo |
| 7,308,413 B1 | 12/2007 | Tota et al. |
| 7,337,462 B2 | 2/2008 | Dudkiewicz et al. |
| 7,367,043 B2 | 4/2008 | Dudkiewicz et al. |
| 7,386,512 B1 | 6/2008 | Allibhoy et al. |
| 7,392,532 B2 | 6/2008 | White et al. |
| 7,409,437 B2 | 8/2008 | Ullman et al. |
| 7,421,729 B2 | 9/2008 | Zenoni |
| 7,426,558 B1 | 9/2008 | Allibhoy et al. |
| 7,444,402 B2 | 10/2008 | Rennels |
| 7,471,834 B2 | 12/2008 | Sull et al. |
| 7,490,346 B2 | 2/2009 | Alao et al. |
| 7,493,643 B2 | 2/2009 | Ellis |
| 7,516,472 B2 * | 4/2009 | Danker ............ H04N 7/17318 348/180 |
| 7,548,565 B2 | 6/2009 | Sull et al. |
| 7,590,997 B2 | 9/2009 | Diaz Perez |
| 7,594,245 B2 | 9/2009 | Sezan et al. |
| 7,596,797 B1 | 9/2009 | Kapner, III et al. |
| 7,606,883 B1 | 10/2009 | Allibhoy et al. |
| 7,624,337 B2 | 11/2009 | Sull et al. |
| 7,631,336 B2 | 12/2009 | Diaz Perez |
| 7,644,429 B2 | 1/2010 | Bayassi et al. |
| 7,650,621 B2 | 1/2010 | Thomas et al. |
| 7,690,020 B2 | 3/2010 | Lebar |
| 7,698,723 B2 | 4/2010 | Hicks, III et al. |
| 7,720,707 B1 | 5/2010 | Mowry |
| 7,725,740 B2 | 5/2010 | Kudelski et al. |
| 7,761,899 B2 | 7/2010 | Buehl et al. |
| 7,774,819 B2 | 8/2010 | Perez |
| 7,801,838 B2 | 9/2010 | Colbath et al. |
| 7,801,910 B2 | 9/2010 | Houh et al. |
| 7,814,519 B2 * | 10/2010 | Rao .................. H04N 7/162 725/101 |
| 7,831,512 B2 | 11/2010 | Akadiri |
| 7,835,920 B2 | 11/2010 | Snyder et al. |
| 7,885,963 B2 | 2/2011 | Sanders |
| 7,900,229 B2 | 3/2011 | Dureau |
| 7,908,626 B2 | 3/2011 | Williamson et al. |
| 7,917,933 B2 | 3/2011 | Thomas et al. |
| 7,921,448 B2 | 4/2011 | Fickle et al. |
| 7,925,973 B2 | 4/2011 | Allaire et al. |
| 7,926,079 B2 | 4/2011 | Lebar |
| 7,945,929 B2 | 5/2011 | Knudson et al. |
| 7,949,722 B1 | 5/2011 | Ullman et al. |
| 7,950,033 B2 | 5/2011 | Pierre et al. |
| 7,962,414 B1 | 6/2011 | Allibhoy et al. |
| 7,974,962 B2 | 7/2011 | Krakirian et al. |
| 7,987,492 B2 | 7/2011 | Liwerant et al. |
| 7,996,861 B1 | 8/2011 | Delpuch |
| 8,006,263 B2 | 8/2011 | Ellis et al. |
| 8,010,988 B2 | 8/2011 | Cox |
| 8,020,187 B2 | 9/2011 | Cox |
| 8,042,132 B2 | 10/2011 | Carney et al. |
| 8,051,450 B2 | 11/2011 | Robarts et al. |
| 8,090,605 B2 | 1/2012 | Tota et al. |
| 8,107,786 B2 | 1/2012 | Sardera |
| 8,112,776 B2 | 2/2012 | Schein et al. |
| 8,122,034 B2 | 2/2012 | Aravamudan et al. |
| 8,151,290 B1 | 4/2012 | Ujihara |
| 8,191,098 B2 | 5/2012 | Cooper et al. |
| 8,205,237 B2 | 6/2012 | Cox |
| 8,214,254 B1 | 7/2012 | Mowry |
| 8,219,446 B1 | 7/2012 | Mowry |
| 8,249,924 B1 | 8/2012 | Mowry |
| 8,281,339 B1 | 10/2012 | Walker et al. |
| 8,315,949 B2 | 11/2012 | Akadiri |
| 8,332,268 B2 | 12/2012 | Carruthers et al. |
| 8,340,994 B2 | 12/2012 | Tota et al. |
| 8,346,605 B2 | 1/2013 | Krikorian et al. |
| 8,365,230 B2 | 1/2013 | Chane et al. |
| 8,434,118 B2 | 4/2013 | Gonder et al. |
| 8,464,302 B1 | 6/2013 | Liwerant et al. |
| 8,473,868 B1 | 6/2013 | Kauffman |
| 8,479,246 B2 | 7/2013 | Hudson et al. |
| 8,566,871 B2 | 10/2013 | Knowles et al. |
| 8,621,541 B2 | 12/2013 | Ullman et al. |
| 8,644,354 B2 | 2/2014 | George et al. |
| 8,650,125 B2 | 2/2014 | Akadiri |
| 8,682,794 B2 | 3/2014 | Akadiri |
| 8,688,582 B2 | 4/2014 | Akadiri |
| 8,707,354 B1 | 4/2014 | Moreau et al. |
| 8,713,595 B2 | 4/2014 | Lemmons et al. |
| 8,843,978 B2 | 9/2014 | Hardin |
| 8,955,029 B2 | 2/2015 | Lewis |
| 8,997,136 B2 | 3/2015 | Brooks et al. |
| 9,047,626 B2 | 6/2015 | Akadiri |
| 9,055,325 B2 | 6/2015 | Gaydou et al. |
| 9,066,118 B2 | 6/2015 | Diaz Perez |
| 9,078,016 B2 | 7/2015 | Diaz Perez |
| 9,106,959 B2 | 8/2015 | Diaz Perez |
| 9,113,228 B2 | 8/2015 | Diaz Perez |
| 9,117,228 B1 | 8/2015 | Akadiri |
| 9,232,275 B2 | 1/2016 | Perez |
| 9,292,866 B2 | 3/2016 | Allaire et al. |
| 9,349,136 B2 | 5/2016 | Akadiri |
| 9,451,310 B2 | 9/2016 | Akadiri |
| 9,635,408 B2 | 4/2017 | Akadiri |
| 2001/0018771 A1 | 8/2001 | Walker et al. |
| 2001/0033736 A1 | 10/2001 | Yap |
| 2001/0049625 A1 | 12/2001 | Mowry |
| 2001/0052132 A1 | 12/2001 | Fryer |
| 2002/0007485 A1 | 1/2002 | Rodriguez et al. |
| 2002/0042921 A1 | 4/2002 | Ellis |
| 2002/0045960 A1 | 4/2002 | Phillips et al. |
| 2002/0056104 A1 | 5/2002 | Burnhouse et al. |
| 2002/0057892 A1 | 5/2002 | Mano et al. |
| 2002/0059621 A1 * | 5/2002 | Thomas ............... G06F 3/0481 725/87 |
| 2002/0066106 A1 | 5/2002 | Kanojia et al. |
| 2002/0069218 A1 | 6/2002 | Sull et al. |
| 2002/0078456 A1 | 6/2002 | Hudson |
| 2002/0083451 A1 | 6/2002 | Gill et al. |
| 2002/0087661 A1 | 7/2002 | Matichuk et al. |
| 2002/0088009 A1 | 7/2002 | Dudkiewicz et al. |
| 2002/0088010 A1 | 7/2002 | Dudkiewicz et al. |
| 2002/0092019 A1 | 7/2002 | Marcus |
| 2002/0104099 A1 * | 8/2002 | Novak ............... H04N 7/17318 725/136 |
| 2002/0120925 A1 | 8/2002 | Logan |
| 2002/0138843 A1 | 9/2002 | Samaan et al. |
| 2002/0138844 A1 | 9/2002 | Otenasek |
| 2002/0143629 A1 * | 10/2002 | Mineyama ............ G06Q 30/02 705/14.73 |
| 2002/0144273 A1 | 10/2002 | Reto |
| 2002/0147975 A1 | 10/2002 | Seo |

(56) References Cited

U.S. PATENT DOCUMENTS

| | | |
|---|---|---|
| 2002/0152224 A1 | 10/2002 | Roth et al. |
| 2002/0152318 A1 | 10/2002 | Menon et al. |
| 2002/0163532 A1 | 11/2002 | Thomas et al. |
| 2002/0174430 A1* | 11/2002 | Ellis .................. G11B 27/005 725/46 |
| 2002/0174433 A1* | 11/2002 | Baumgartner .......... H04N 5/76 725/58 |
| 2002/0184634 A1 | 12/2002 | Cooper |
| 2002/0184635 A1 | 12/2002 | Istvan |
| 2002/0194194 A1 | 12/2002 | Fenton et al. |
| 2002/0199188 A1* | 12/2002 | Sie .................. H04N 21/00 725/35 |
| 2003/0009542 A1 | 1/2003 | Kasal et al. |
| 2003/0016940 A1 | 1/2003 | Robbins |
| 2003/0018971 A1 | 1/2003 | McKenna |
| 2003/0037010 A1 | 2/2003 | Schmelzer |
| 2003/0055893 A1 | 3/2003 | Sato et al. |
| 2003/0084126 A1 | 5/2003 | Kumar et al. |
| 2003/0084449 A1 | 5/2003 | Chane et al. |
| 2003/0093790 A1 | 5/2003 | Logan et al. |
| 2003/0101451 A1 | 5/2003 | Bentolila et al. |
| 2003/0110506 A1* | 6/2003 | Kim .................. H04N 7/17336 725/95 |
| 2003/0126605 A1 | 7/2003 | Betz et al. |
| 2003/0149975 A1 | 8/2003 | Eldering et al. |
| 2003/0149981 A1 | 8/2003 | Finster et al. |
| 2003/0154128 A1 | 8/2003 | Liga |
| 2003/0154475 A1 | 8/2003 | Rodriguez et al. |
| 2003/0163375 A1 | 8/2003 | Dombrowski et al. |
| 2003/0167449 A1 | 9/2003 | Warren |
| 2003/0167471 A1 | 9/2003 | Roth et al. |
| 2003/0191816 A1 | 10/2003 | Landress |
| 2003/0204856 A1 | 10/2003 | Buxton |
| 2003/0208756 A1 | 11/2003 | Macrae et al. |
| 2003/0226150 A1 | 12/2003 | Berberet |
| 2003/0234819 A1 | 12/2003 | Daly |
| 2004/0015989 A1 | 1/2004 | Kaizu et al. |
| 2004/0015998 A1 | 1/2004 | Bokor |
| 2004/0049788 A1 | 3/2004 | Mori et al. |
| 2004/0073919 A1 | 4/2004 | Gutta et al. |
| 2004/0078825 A1 | 4/2004 | Murphy |
| 2004/0103120 A1 | 5/2004 | Fickle et al. |
| 2004/0117844 A1 | 6/2004 | Karaoguz et al. |
| 2004/0133918 A1 | 7/2004 | Danker |
| 2004/0136698 A1 | 7/2004 | Mock |
| 2004/0148626 A1 | 7/2004 | Sakao et al. |
| 2004/0158855 A1* | 8/2004 | Gu .................. H04N 5/44543 725/39 |
| 2004/0172419 A1 | 9/2004 | Morris et al. |
| 2004/0194141 A1 | 9/2004 | Sanders |
| 2004/0205816 A1 | 10/2004 | Barrett |
| 2004/0221325 A1* | 11/2004 | Nakajima .............. H04H 60/27 725/145 |
| 2004/0231004 A1* | 11/2004 | Seo .................. H04N 7/17318 725/142 |
| 2004/0268250 A1 | 12/2004 | Danker |
| 2004/0268413 A1 | 12/2004 | Reid et al. |
| 2005/0049933 A1 | 3/2005 | Upendran et al. |
| 2005/0050218 A1 | 3/2005 | Sheldon |
| 2005/0044577 A1 | 4/2005 | Jerding |
| 2005/0081237 A1 | 4/2005 | Chen |
| 2005/0097600 A1* | 5/2005 | Heer .................. H04N 5/445 725/37 |
| 2005/0097622 A1 | 5/2005 | Zigmond et al. |
| 2005/0097623 A1 | 5/2005 | Tecot |
| 2005/0129049 A1 | 6/2005 | Srinivasan et al. |
| 2005/0131837 A1* | 6/2005 | Sanctis .................. G06Q 20/12 705/64 |
| 2005/0138560 A1 | 6/2005 | Lee et al. |
| 2005/0149987 A1 | 7/2005 | Boccon-Gibod et al. |
| 2005/0160458 A1 | 7/2005 | Baumgartner |
| 2005/0160465 A1 | 7/2005 | Walker |
| 2005/0166230 A1 | 7/2005 | Gaydou et al. |
| 2005/0188415 A1 | 8/2005 | Riley |
| 2005/0154679 A1 | 9/2005 | Bielak |
| 2005/0193015 A1 | 9/2005 | Logston |
| 2005/0203918 A1 | 9/2005 | Holbrook |
| 2005/0204388 A1 | 9/2005 | Knudson et al. |
| 2005/0210524 A1 | 9/2005 | Dolph |
| 2005/0216941 A1* | 9/2005 | Flanagan .............. H04N 7/17336 725/88 |
| 2005/0229209 A1 | 10/2005 | Hildebolt et al. |
| 2005/0235318 A1 | 10/2005 | Grauch et al. |
| 2005/0235319 A1 | 10/2005 | Carpenter et al. |
| 2005/0239546 A1 | 10/2005 | Hedrick |
| 2005/0240961 A1 | 10/2005 | Jerding et al. |
| 2005/0240968 A1 | 10/2005 | Knudson et al. |
| 2005/0246752 A1 | 11/2005 | Liwerant et al. |
| 2005/0283800 A1 | 12/2005 | Ellis et al. |
| 2005/0289151 A1 | 12/2005 | Burke |
| 2006/0004914 A1 | 1/2006 | Kelly et al. |
| 2006/0015925 A1 | 1/2006 | Logan |
| 2006/0029093 A1 | 2/2006 | Van Rossum |
| 2006/0085830 A1 | 4/2006 | Bruck et al. |
| 2006/0123455 A1 | 6/2006 | Pai |
| 2006/0155850 A1 | 7/2006 | Ma et al. |
| 2006/0174260 A1 | 8/2006 | Gutta |
| 2006/0267995 A1 | 11/2006 | Radloff et al. |
| 2006/0287916 A1 | 12/2006 | Starr et al. |
| 2007/0016530 A1 | 1/2007 | Stasi et al. |
| 2007/0038567 A1 | 2/2007 | Allaire et al. |
| 2007/0157221 A1 | 7/2007 | Ou et al. |
| 2007/0157249 A1 | 7/2007 | Cordray et al. |
| 2007/0198532 A1 | 8/2007 | Krikorian et al. |
| 2007/0214482 A1 | 9/2007 | Nguyen |
| 2007/0245399 A1 | 10/2007 | Espelien |
| 2007/0250864 A1 | 10/2007 | Diaz Perez |
| 2007/0277201 A1* | 11/2007 | Wong .................. H04N 5/44543 725/40 |
| 2008/0022298 A1 | 1/2008 | Cavicchia |
| 2008/0072260 A1 | 3/2008 | Rosin et al. |
| 2008/0127257 A1 | 5/2008 | Kvache |
| 2008/0141325 A1 | 6/2008 | Ludvig et al. |
| 2008/0148317 A1 | 6/2008 | Opaluch |
| 2008/0155613 A1* | 6/2008 | Benya .................. H04N 7/17318 725/89 |
| 2008/0163292 A1 | 7/2008 | Stallworth |
| 2008/0163330 A1 | 7/2008 | Sparrell |
| 2008/0189749 A1 | 8/2008 | White et al. |
| 2008/0222687 A1 | 9/2008 | Edry |
| 2008/0276277 A1 | 11/2008 | Ahn et al. |
| 2009/0055868 A1 | 2/2009 | Wehmeyer et al. |
| 2009/0158334 A1 | 6/2009 | Rodriguez et al. |
| 2010/0138863 A1 | 6/2010 | Diaz Perez |
| 2010/0153999 A1 | 6/2010 | Yates |
| 2010/0175090 A1* | 7/2010 | Cordray .................. H04N 5/782 725/58 |
| 2010/0211975 A1 | 8/2010 | Boyer et al. |
| 2010/0319040 A1 | 12/2010 | Diaz Perez |
| 2010/0325655 A1 | 12/2010 | Diaz Perez |
| 2011/0030012 A1 | 2/2011 | Diaz Perez |
| 2011/0030013 A1 | 2/2011 | Diaz Perez |
| 2011/0166918 A1 | 7/2011 | Allaire et al. |
| 2011/0191163 A1 | 8/2011 | Allaire et al. |
| 2013/0125158 A1 | 5/2013 | Brown |
| 2013/0254804 A1 | 9/2013 | Diaz Perez |
| 2013/0254809 A1 | 9/2013 | Diaz Perez |
| 2013/0254814 A1 | 9/2013 | Diaz Perez |
| 2014/0344859 A1 | 11/2014 | Krikorian et al. |
| 2015/0128192 A1 | 5/2015 | Diaz Perez |
| 2015/0237403 A1 | 8/2015 | Perez |
| 2015/0245099 A1 | 8/2015 | Perez |
| 2015/0264440 A1 | 9/2015 | Perez |
| 2015/0281792 A1 | 10/2015 | Gaydou et al. |
| 2015/0358682 A1 | 12/2015 | Perez |
| 2015/0358683 A1 | 12/2015 | Perez |

(56) References Cited

U.S. PATENT DOCUMENTS

| | | | |
|---|---|---|---|
| 2016/0094870 A1* | 3/2016 | Drope | G06F 21/10 725/31 |
| 2017/0295387 A1 | 10/2017 | Akadiri | |

FOREIGN PATENT DOCUMENTS

| | | |
|---|---|---|
| IE | WO01038960 | 5/2001 |
| JP | 07-284035 | 10/1995 |
| JP | 11-150692 | 6/1999 |
| JP | 03-116121 | 4/2003 |
| WO | 89/12896 A1 | 12/1989 |
| WO | 90/15507 A1 | 12/1990 |
| WO | 9406084 A1 | 3/1994 |
| WO | 99/10822 A1 | 3/1999 |
| WO | 99/41684 A1 | 8/1999 |
| WO | 9950778 A1 | 10/1999 |
| WO | 01/010124 A1 | 2/2001 |
| WO | 01/10127 A1 | 2/2001 |
| WO | WO01022688 | 3/2001 |
| WO | 2002008948 A2 | 1/2002 |
| WO | 03/052572 A1 | 6/2003 |
| WO | WO03052572 | 6/2003 |
| WO | WO03069457 | 8/2003 |
| WO | WO 2007/021974 A2 | 2/2007 |

OTHER PUBLICATIONS

TimeWarner, Time Warner Cable Launches Quick Clips, http://www.timewarner.com/newsroom/press-releases/2006/09/28/time-warner-cable-launches-quick-clips (published Sep. 28, 2006, last visited Jun. 26, 2015).
Time Warner Cable, Photos & Video Go from Digital Cameras to Television with Free, New Time Warner Cable Product, http://www.timewarnercable.com/en/about-us/press/photos_video_go_fromdigitalcamerastotelevisionwithfreenewtimewar.html (published Apr. 27, 2007, last visited Jun. 26, 2015).
International Search Report, dated Mar. 6, 2006, in PCT International Application US2005/027376, of Broadband iTV, Inc.
International Search Report, dated Sep. 15, 2009, in PCT International Application US2008/003341, of Broadband iTV, Inc.
International Search Report, dated Nov. 28, 2008, in PCT International Application US2008/007980, of Broadband iTV, Inc.
The Industry Standard, "Web Entertainment Gets Personal", Jan. 10, 2000, www.thestandard.com.
Affidavit of Milton Diaz Perez Under C.F.R. 132, Mar. 9, 2009, submitted in U.S. Appl. No. 10/909,192, filed Jul. 3, 2004.
Affidavit of Milton Diaz Perez, Ex. A, Wikipedia, "Cable Television in the United States", history, last modified Jan. 17, 2009, pp. 1-7, http://en.wikipedia.org/wiki/Cable_Television_in_the_United_States.
Affidavit of Milton Diaz Perez, Ex. B, Wikipedia, "Internet Television", history, last modified Feb. 5, 2009, pp. 1-4, http://en.wikipedia.org/wiki/Internet_TV.
Affidavit of Milton Diaz Perez, Ex. C, Wikipedia, "Content Delivery Network", history, last modified Feb. 10, 2009, pp. 1-6, http://en.wikipedia.org/wiki/Content_Delivery_Network.
Affidavit of Milton Diaz Perez, Ex. D, Wikipedia, "Walled Garden (technology)", history, last modified Feb. 3, 2009, pp. 1-2, http://en.wikipedia.org/wiki/Walled_Garden_(technology).
Affidavit of Milton Diaz Perez, Ex. E, Wikipedia, "User-generated TV", history, last modified Feb. 10, 2009, pp. 1-2, http://en.wikipedia.org/wiki/User-generated_TV.
Affidavit of Milton Diaz Perez, Ex. E1, Wikipedia, "ZeD", history, last modified Jan. 5, 2009, pp. 1-7, http://en.wikipedia.org/wiki/ZeD.
Affidavit of Milton Diaz Perez, Ex. E2, Wikipedia, "Current TV", history, last modified Feb. 5, 2009, pp. 1-5, http://en.wikipedia.org/wiki/Current_TV.
Affidavit of Milton Diaz Perez, Ex. E3, outloud.tv, tripatlas, circa 2003, http://tripatlas.com/Outloud.tv.
Patent Owner's Preliminary Response, Jan. 2, 2015, CBM2014-00189, *Hawaiian Telecom, Inc.* v. *Broadband iTV, Inc.*, re U.S. Pat. No. 7,631,336.
Decision Denying Institution of Inter Partes Review, Jan. 5, 2015, IPR2014-01222, *Unified Patents* v. *Broadband iTV, Inc.*, re U.S. Pat. No. 7,631,336.
Adams, Open Cable Architecture (Cisco Press 2000), Chapter 8-16.
ATSC Standard: Program and System Information Protocol for Terrestrial Broadcast and Cable (PSIP) (Dec. 23, 1997).
Attack of the $500 Killer Network Computers: Time-Warner Cable's Full Service Network, Network Computing (Aug. 19, 2000) Internet Archive, https://web.archive.org/web/20000819050301/http://www.networkcomputing.com/616/616tw.html.
CableLabs Video-On-Demand Asset Distribution Interface Specification, Version 1.1 (Sep. 27, 2002).
CableLabs Video-On-Demand Content Specification Version 1.1 (Jan. 7, 2004).
Declaration of Milton Diaz Perez, *Broadband iTV, Inc.* v. *Hawaiian Telcom, Inc. et al.*, No. 14-cv-00169-ACK-KSC (D. Haw. Mar. 2, 2015).
Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit A, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit B, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit C, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit E, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit F, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Exhibit G, Defendants' Joint Preliminary Invalidity Contentions, *Broadband iTV, Inc.* v. *Hawaiian Telcom, Inc. et al.*, No. 14-cv-00169-ACK-KSC (D. Haw. Feb. 20, 2015).
Fickle et al., U.S. Appl. No. 60/429,966, filed Nov. 27, 2002.
Full Service Network and The Orlando Sentinel add interactive dining guide to GOtv, The Free Library, http://www.thefreelibrary.com/Full+Service+Network+and+The+Orlando+Sentinel+add+interactive+dining . . . -a018299720 (published May 20, 1996, last visited Mar. 4, 2015).
Full Service Network(FSN) in Orlando, Florida, Hong Kong University of Science and Technology (May 4, 1997) Internet Archive, https://web.archive.org/web/19970504203603/http://www.ust.hk/~webiway/content/USA/Trial/fsn.html.
Full Service Network, Time Warner Cable, http://m.history.timewarnercable.com/the-twc-story/era-1990-1995/Story.aspx?story=56 (last visited Mar. 4, 2015).
Full Service Network, Wikipedia, http://en.wikipedia.org/w/index.php?title=Full_Service_Network&printable=yes (last visited Mar. 4, 2015).
Tanenbaum, Computer Networks, 4th ed. (Prentice Hall PTR 2003), pp. 1-14.
Time Warner Cable, DRAFT Asset Distribution System ("Catcher's Mitt") Functional Requirements, Version 1.0 (Jan. 26, 2000).
Time Warner Cable, ISA Data Download Delivery, Version 0.5 (Jun. 3, 2004).
Time Warner Cable, Pegasus Interactive Services Architecture, Version 1.4 (Jun. 5, 2003).
Time Warner Cable, The ISA Tutorial, Version 1.0 (Sep. 13, 2003).
Time Warner Cable's Full Service Network connects live to Innoventions, AllBusiness (published Apr. 10, 1996, archived Mar. 25, 2008) Internet Archive, https://web.archive.org/web/20080325024937/http://www.allbusiness.com/media-telecommunications/telecommunications/7218809-1.html.

(56) References Cited

OTHER PUBLICATIONS

Time Warner introduces world's first full service network in Orlando; Network offers First . . . , AllBusiness (published Dec. 14, 1994, archived May 22, 2009) Internet Archive, https://web.archive.org/web/20090522134441/http://www.allbusiness.com/media-telecommunications/telecommunications/7087127-1.html.
Time Warner will close its Full Service Network, Orlando Business Journal, http://www.bizjournals.com/orlando/stories/1997/04/28/daily7.html (last visited Mar. 4, 2015).
Time Warner's 'Time Machine' for Future Video, The New York Times, http://www.nytimes.com/ . . . /12/business/time-warner-s-time-machine-for-future-video.html?pagewanted=2&pagewanted=print (publsihed Dec. 12, 1994, last visited Mar. 4, 2015).
Time Warner Cable, Request for Proposal and Functional Requirements Specification for Video-On-Demand (VOD) Systems, Version 2.0 (Apr. 25, 1997).
Time Warner Cable, Pegasus Movies on Demand Content Specification, Version 1.3 (Sep. 29, 2000).
Time Warner Cable, Pegasus Overall Flow: Movie Delivery, Version 1.0 (Feb. 18, 2004).
Defendants Oceanic Time Warner Cable, LLC and Time Warner Cable Inc.'s Motion for Summary Judgment Regarding Invalidity of U.S. Pat. No. 7,631,336 (ECF 474), *Broadband iTV, Inc. v. Hawaiian Telcom, Inc. et al.*, No. 1:14-cv-00169 (D. Haw. Aug. 10, 2015) (5 pgs).
Memorandum in Support of Defendants Oceanic Time Warner Cable LLC and Time Warner Cable Inc.'s Motion for Summary Judgment Regarding Invalidity of U.S. Pat. No. 7,631,336 (ECF 474-1), *Broadband iTV, Inc. v. Hawaiian Telcom, Inc. et al.*, No. 1:14-cv-00169 (D. Haw. Aug. 10, 2015) (49 pgs).
Concise Statement of Facts in Support of Defendants Oceanic Time Warner Cable LLC and Time Warner Cable Inc.'s Motion for Summary Judgment Regarding Invalidity of U.S. Pat. No. 7,631,336 (ECF 475), *Broadband iTV, Inc. v. Hawaiian Telcom, Inc. et al.*, No. 1:14-cv-00169 (D. Haw. Aug. 10, 2015) (12 pgs).
Declaration of Nathan L. Brown (ECF 475-1), *Broadband iTV, Inc. v. Hawaiian Telcom, Inc. et al.*, No. 1:14-cv-00169 (D. Haw. Aug. 10, 2015) (6 pgs).
Exhibits 1 (ECF 475-2), 4 (ECF 475-5), 5 (ECF 475-6), and 6 (ECF 475-7) to Concise Statement of Facts in Support of Defendants Oceanic Time Warner Cable LLC and Time Warner Cable Inc.'s Motion for Summary Judgment Regarding Invalidity of U.S. Pat. No. 7,631,336, *Broadband iTV, Inc. v. Hawaiian Telcom, Inc. et al.*, No. 1:14-cv-00169 (D. Haw. Aug. 10, 2015) (133 pgs).
Plaintiff's Opposition to Defendants Time Warner Cable, Inc. and Oceanic Time Warner Cable, LLC's Motion for Summary Judgment Regarding Invalidity of U.S. Pat. No. 7,631,336 (ECF 561), *Broadband iTV, Inc. v. Hawaiian Telcom, Inc. et al.*, No. 1:14-cv-00169 (D. Haw. Aug. 27, 2015) (52 pgs).
Plaintiff Broadband iTV, Inc.'s Concise Statement of Facts in Opposition to Defendants Oceanic Time Warner Cable and Time Warner Cable, Inc.'s Concise Statement of Facts (ECF 562), *Broadband iTV, Inc. v. Hawaiian Telcom, Inc. et al.*, No. 1:14-cv-00169 (D. Haw. Aug. 27, 2015) (8 pgs).
Declaration of Keith A. Jones (ECF 562-1), Inc.'s Concise Statement of Facts, *Broadband iTV, Inc. v. Hawaiian Telcom, Inc. et al.*, No. 1:14-cv-00169 (D. Haw. Aug. 27, 2015) (8 pgs).
Exhibits 1-10 (ECF 562-2-ECF-11), 12 (ECF 562-13), 14 (ECF 562-15), 16-17 (ECF 562-17-562-18), and 19-20 (ECF 562-20-562-21) to Plaintiff Broadband iTV, Inc.'s Concise Statement of Facts in Opposition to Defendants Oceanic Time Warner Cable and Time Warner Cable, Inc.'s Concise Statement of Facts, *Broadband iTV, Inc. v. Hawaiian Telcom, Inc. et al.*, No. 1:14-cv-00169 (D. Haw. Aug. 27, 2015) (508 pgs).
Order Granting in Part and Denying in Part Defendants Oceanic Time Warner Calbe, LLC and Time Warner Cable, Inc.'s Motion for Summary Judgment Regarding Invalidity of U.S. Pat. No. 7,631,336, *Broadband iTV, Inc. v. Oceanic Time Warner Cable, LLC and Time Warner Cable, Inc.*, No. 15-00131 (D. Haw. Sep. 29, 2015) (77 pgs).

Judgment, *Broadband iTV, Inc. v. Oceanic Time Warner Cable, LLC and Time Warner Cable, Inc.*, No. 15-00131 (D. Haw. Sep. 29, 2015) (2 pgs).
Plaintiff'S Notice of Appeal; Certificate of Service, *Broadband iTV, Inc. v. Oceanic Time Warner Cable, LLC and Time Warner Cable, Inc.*, No. 15-00131 (D. Haw. Oct. 9, 2015) (4 pgs).
Order Granting Defendant Hawaiian Telcom, Inc.'s Motion for Summary Judgment of Invalidity Under 35 U.S.C. § 101, *Broadband iTV, Inc. v. Hawaiian Telcom, Inc.*, No. 14-00169 (D. Haw. Sep. 29, 2015) (43 pgs).
Judgment, *Broadband iTV, Inc. v. Hawaiian Telcom, Inc.*, No. 14-00169 (D. Haw. Sep. 29, 2015) (2 pgs).
Plaintiff's Notice of Appeal; Certificate of Service, *Broadband iTV, Inc. v. Hawaiian Telcom, Inc.*, No. 14-00169 (D. Haw. Oct. 9, 2015) (4 pgs).
Brief of Amici Curiae Broadband iTV, Inc., Double Rock Corporation, Island Intellectual Property, LLC, Access Control Advantage, Inc., and Fairway Financial U.S., Inc. In Support of Appellants, *Netflix, Inc. v. Rovi Corporation et al.*, No. 2015-1917 (Fed. Cir. Dec. 18, 2015).
Consolidated Brief for Appellant Broadband iTV, Inc., *Broadband iTV, Inc. v. Hawaiian Telcom, Inc. et al.*, No. 16-1082 (Fed. Cir. Jan. 21, 2016).
Amicus Brief of United Inventors Association of the United States of America in Support of Appellant Broadband iTV, Inc. and Reversal, *Broadband iTV, Inc. v. Hawaiian Telcom, Inc. et al.*, No. 16-1082 (Fed. Cir. Jan. 27, 2016).
Amicus Brief by Tranxition, Inc., *Broadband iTV, Inc. v. Hawaiian Telcom, Inc. et al.*, No. 16-1082 (Fed. Cir. Jan. 28, 2016).
EPO Communication for European Application No. 08726793.6, dated May 30, 2016.
EPO Communication for European Application No. 08768802.4, dated May 30, 2016.
VDO expands Webcasting possibilities, Broadcasting & Cable, Nov. 11, 1996.
Jose Alvear, "Web Developer.com Guide to Streaming Multimedia", Chapters 9 and 11, 1998.
Business Wire, "Ivex Announces ViewOps Internet Video Service; Allows Business Managers to View and Manage Operations Online," May 2, 2000.
Notice of Entry of Judgment Without Opinion for Case No. 2016-1082 of the United States Court of Appeals for the Federal Circuit dated Sep. 26, 2016.
Judgment, *Broadband iTV, Inc. v. Hawaiian Telcom, Inc., Oceanic Time Warner Cable, LLC and Time Warner Cable, Inc.*, Nos. 2016-1082, 2016-1083 (CAFC Sep. 26, 2016) (2 pgs).
Affidavit of Milton Diaz Perez Under 37 C.F.R. 132, Jan. 20, 2012, submitted in U.S. Appl. No. 11/768,895.
VOD Metadata—Project Primer, Overview of VOD Content Specification 1.0, 1.1, and 2.0, published by Cable Labs, circa 2002-2007, http://www.cablelabs.com/projects/metadata/primer.
XOD Capsule, issue dated Apr. 11, 2006, includes article "Bresnan Taps CMC for VOD", published by Communications, Engineering & Design Magazine, http://www.cedmagazine.com/newsletter.aspx?id=67468.
Comcast Media Center, Content Gateway, Content Distribution website, circa 2010, http://www.comcastmediacenter.com/content-gateway.
Petition for Inter Partes Review, IPR2014-01222, *Unified Patents, Inc. v. Broadband iTV, Inc.*, re U.S. Pat. No. 7,631,336.
Petition for Covered Business Method Review, CBM2014-00189, *Hawaiian Telecom, Inc. v. Broadband iTV, Inc.*, re U.S. Pat. No. 7,631,336.
*Broadband iTV, Inc. v. Hawaiian Telcom, Inc. et al*; BBiTV Petition for a Writ of Certiorari (Sup. Ct. Apr. 13, 2017 No. 16-1241)).
Order List 581 U.S. Sup. Ct.—Monday, May 22, 2017—*Broadband ITV, Inc. v. Hawaiian Telcom, Inc., et al.*, Petition for Writ of Certiorari Denied (p. 7).
Ciciora, Farmer, & Large, Modern Cable Television Technology (Morgan Kaufmann Publishers, Inc. 1999), 18 pages.

\* cited by examiner

VOD Content Delivery System, Overall Architecture

Drill Down Navigation Example

Template Layer Model

Classified Ad System, Overall Architecture

Web-Based Content Management System

Content Screening System

Content Feed and Conversion System

VOD Content Delivery System, Overall Architecture for IPTV System

```
EPG:
  /News
    /Anywhere Rpts
      /NYC
        /Financial
- - -▷ /"Live from
```

FIND TITLE
PRESS KEY TO "STORE BOOKMARKS"

602

```
BOOKMARK USER:
  Enter PIN:
```

ENTER PIN NUMBER

603

```
BOOKMARK OPTIONS:

A. Bookmark it now
  B. Send TV friend
  C. Related programs
  D. Biblio info
```

SELECT "A" TO BOOKMARK IT NOW

604

```
STORED BOOKMARKS:
/News/Anywhere/NYC/...
/Docum/PBS/Nova/...
/Host/Cramer,Jim/...

A:    B:    C:    D:
```

LAST BOOKMARK AT TOP OF LIST
VIEWER CAN MANAGE LIST

FIG. 8
From Step 701, Option "D"
801
VIEWER EMAIL ADDR(S):
  1. PerezM@yahoo.com
  2. PerezJ@hotmail.com
ENTER: _____
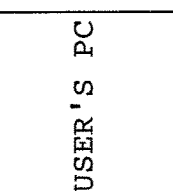
WEB-BASED CONTENT MGMT SYS (40)
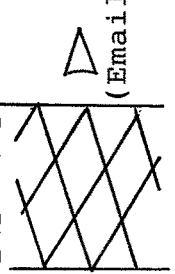
INTERNET (Email)
USER'S PC
604 - VIEWER'S BOOKMARKS
RECEIVED/FOUND/SAVED:
/Host/Cramer,Jim/....
WEB-BASED CONTENT MGMT SYS (40)
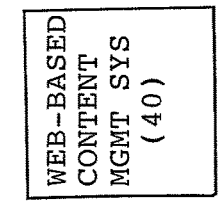
INTERNET
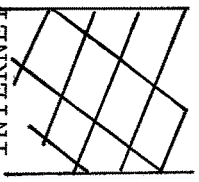
USER'S PC
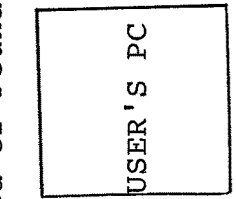
Received or Found Bookmarks
802

METHOD FOR ADDRESSING ON-DEMAND TV PROGRAM CONTENT ON TV SERVICES PLATFORM OF A DIGITAL TV SERVICES PROVIDER

CROSS-REFERENCE TO RELATED APPLICATIONS

This U.S. Patent Application is a continuation application and claims the benefit of copending U.S. patent application Ser. No. 12/632,745, filed on Dec. 7, 2009, of the same inventor and entitled "METHOD OF ADDRESSING ON-DEMAND TV PROGRAM CONTENT ON TV SERVICES PLATFORM OF A DIGITAL TV SERVICES PROVIDER", which was a divisional application of U.S. patent application Ser. No. 11/685,188, filed on Mar. 12, 2007, of the same inventor, entitled "METHOD FOR CONVERTING, NAVIGATING AND DISPLAYING VIDEO CONTENT UPLOADED FROM THE INTERNET TO A DIGITAL TV VIDEO-ON-DEMAND PLATFORM" and which issued as U.S. Pat. No. 7,631,336 on Dec. 8, 2009[H], This application is further related to which was a continuation in part application of U.S. patent application Ser. No. 10/909,192, filed on Jul. 30, 2004, of the same inventor, entitled "SYSTEM AND METHOD FOR MANAGING, CONVERTING AND DISPLAYING VIDEO CONTENT ON A VIDEO-ON-DEMAND PLATFORM, INCLUDING ADS USED FOR DRILL-DOWN NAVIGATION AND CONSUMER-GENERATED CLASSIFIED ADS", which issued as U.S. Pat. No. 7,590,997 on Sep. 15, 2009. Each of these applications are, each of which ii hereby incorporated by reference as if fully set forth herein.

TECHNICAL FIELD

This invention generally relates to the provision of video content to viewers through digital TV infrastructure, and more particularly, to converting, navigating and displaying video content uploaded from the Internet on a digital TV video-on-demand platform.

BACKGROUND OF INVENTION

Cable television (CATV) systems are used to deliver television services to a vast majority of TV-viewing homes in the U.S. and other technologically advanced countries. The typical CATV system has a cable service provider head end equipped with video servers to transmit CATV program signals through distribution cable lines to local nodes and from there to TV subscriber homes. Within the subscriber homes, the CATV input TV line is connected to one or more customer-premises TVs which are coupled to external set-top boxes for channel tuning or are equipped with internal cable channel tuners. CATV service providers employ the spacious 1 GHz bandwidth of the typical cable (RG-6) line to carry tens of analog TV channels in the portion of the cable bandwidth allocated to analog TV signals. With digital multiplexing methods such as QAM, hundreds of digital TV signals can be carried simultaneously in the portion of the cable bandwidth allocated to digital TV signals. Cable TV service providers have also allocated portions of the cable bandwidth for user (return) data, broadband data connection, and voice-over-IP (VoIP) digital telephone service.

Cable TV service providers generally offer subscribers to subscribe to any of several tiers of bundled TV services on a scale with increasing rates in accordance with signal quality, TV program offerings, and types of interactive services. Digital TV services are offered through advanced digital set-top boxes that are individually addressable from the CATV head end, and also allow subscribers various interactive functions with the CATV head end via inputs to the set-top box via the remote control unit for transmission on the return data path to the CATV head end.

A recent type of interactive television service offered on digital TV systems is referred to generally as a "video-on-demand" (VOD) system, wherein a viewer can navigate through a program guide via the remote control unit and send a request via the set-top box for a desired video program to be addressed from the head-end to the subscriber's set-top box for display on the TV. Different types of VOD programs are typically bundled as a package and offered on different VOD "channels". For example, a VOD "channel" can offer on-demand movies and videos, replay sports events, infomercials, advertisements, music videos, short-subjects, and even individual TV "pages". VOD-based interactive television services generally allow a viewer to use the remote control to cursor through an on-screen menu and select from a variety of titles for stored video programs for individual viewing on demand. Advanced remote control units include button controls with VCR-like functions that enable the viewer to start, stop, pause, rewind, or replay a selected video program or segment. In the future, VOD-based interactive television services may be integrated with or delivered with other advanced interactive television services, such as webpage browsing, e-mail, television purchase ("t-commerce") transactions, and multimedia delivery.

Digital cable TV is currently the most prevalent system for offering digital TV services to home TV subscribers. However, other types of digital carriers offering broadband connections to subscriber homes have entered into competition with cable TV providers by offering digital TV services over their broadband connections. Examples of other broadband connections include DSL telephone lines, local area broadband networks, and wireless broadband networks. Digital television services offered on such broadband connections employ the TCP/IP data transport protocol and are referred to as Internet Protocol Television (IPTV). Instead of multi-casting all TV program signals into a cable line, the typical IPTV system will respond to a subscriber's request for a particular TV channel or video program by transmitting the video content individually to the subscriber's individually addressable, digital set top box at high speeds. IPTV and digital cable TV both transmit digital video in packetized data streams within closed, proprietary broadband systems; however, IPTV uses the Internet Protocol (IP) to structure, route and deliver the digital video packets within an IPTV system.

With the increasing interactive functionality and customer reach of interactive television services, advertisers and content providers are find it increasingly attractive to employ on-demand advertising, on-demand program content, and on-demand TV transactions for home viewers. VOD content delivery platforms are being designed to seamlessly and conveniently deliver a wide range of types of advertising, video content, and transaction services on demand to home viewers. VOD content offerings are expected to increase dramatically from a few "channels" with a few score or hundred "titles" listed on each today to scores or hundreds of channels with thousands if not millions of titles on each in the foreseeable future. The VOD platform thus offers a gateway for greatly expanding TV viewing from a relatively small number of studio-produced program channels to a large number of new commercial publishers and ultimately a vast number of self-publishers or so-called "citizen" content publishers. It is deemed desirable to find a way for such vast numbers of content publishers to transmit their programs to the home TV, and to enable home TV viewers to find something of interest for viewing among the vast numbers of new programs.

SUMMARY OF THE INVENTION

In accordance with the present invention, a method for converting, navigating and displaying video content via a video-on-demand (VOD) platform of a digital TV service provider comprises:

(a) uploading video content in a digital video format via an online network to a Web-based content management server of the VOD platform of the digital TV service provider, along with a title and a hierarchical addressing tag of hierarchically-arranged categories and subcategories for categorizing the title for the video content;

(b) converting the content uploaded to the Web-based content management server into a standard TV digital format and storing a "local instance" thereof at a video ID (VID) address in a video content database of the VOD platform, wherein the VID address is linked to the metadata title for the video content;

(c) listing the title of the video content in an electronic program guide of the VOD platform following the same hierarchically-arranged categories and subcategories as the hierarchical addressing tag of the video content;

(d) providing a TV subscriber, having a TV-connected set-top box addressable by the digital TV service provider, with access to the electronic program guide for navigating through the hierarchically-arranged categories and subcategories therein in order to find the title of the video content; and (e) upon the subscriber selecting, via a remote control unit in communication with the set-top box, the title of the video content from the hierarchically-arranged categories and subcategories of the electronic program guide, then transmitting a return request for the selected title to the VOD platform for retrieving the video content stored at the linked VID address in the video content database of the VOD platform, and transmitting the video content to the subscriber's set-top box for display on the subscriber's TV.

By the method of the present invention, video content can be published for viewing on home TV with any digital TV service provider by uploading from any node or publishing site on the Internet to the provider's Web-based content management server. The title of the program becomes automatically listed in the electronic program guide (EPG) following the same hierarchical categorization addressing indicated by the publisher of the content. Typically, the publisher will select the categories and subcategories for categorizing the title of the video content from a standard categorization hierarchy used by the digital television service provider for listing titles to be offered on its VOD platform. With this method, vast numbers of content publishers anywhere on the Internet can upload their programs to digital television service providers for viewing on the home TV, and home TV viewers can readily find something of interest for viewing among the vast numbers of new programs by navigating through the hierarchical addressing scheme of the provider's EPG.

In particular, the invention method provides a convenient and substantially automatic vehicle for bringing large numbers of new blogging and podcasting-like programs to TV viewing. Such a blogging or podcasting-like program is typically presented in the video content by a "host" or "celebrity" who has been identified, or can be voted on by viewers, as a popular "Host". The Host acts as a filter, reviewer, rater, and/or analyst to bring information of value to viewers from the plethora of content populating the viewing landscape. The Host can also serve to link the viewer to other Host programs or other VOD-listed programs, for example, by on-screen directing of the viewer to a menu of options selectable by corresponding option keys on the remote control unit. As an added feature, the EPG can be configured to enable a viewer to store bookmarks for desired VOD-listed TV programs for viewing again or with friends. The viewer's bookmarks can also be shared with other subscribers via an on-screen Contact List maintained for each viewer, and/or shared with others online by the provider enabling transmission of the bookmark data from the VOD platform to the viewer's email address or other online address.

The capability for Internet uploading and automatic listing in any VOD EPG opens VOD programming to a greatly expanded field of non-studio TV program publishers. The digital TV service provider can charge program placement fees that are paid by the publisher, advertiser, and/or sponsor. With future expansion of VOD "channel" capacity, the system can be opened to "citizen" publishers and paid for by program advertisers or sponsors and/or by viewer "Premium (VOD) Services" fees.

The foregoing and other objects, features and advantages of the invention are described in further detail below in conjunction with the accompanying drawings.

BRIEF DESCRIPTION OF THE DRAWINGS

FIG. 6 is a diagram illustrating the logic flow for using an EPG to enable a viewer to store TV bookmarks for desired VOD-listed TV programs.

FIG. 8 is a diagram illustrating an example of sharing TV bookmarks with others on the Internet by transmission of bookmark data to the viewer's email address.

DETAILED DESCRIPTION OF INVENTION

The following description describes one preferred embodiment for implementation of the invention in which the digital television service provider is one employing cable TV infrastructure. However, it is to be understood that the principles of the invention are equally applicable to other types of digital television service providers offering digital TV services over other broadband connections such as DSL telephone lines, local area broadband networks, and wireless broadband networks. Similarly, certain examples of VOD applications are described herein, e.g., advertisements that are navigated in "drill-down" fashion, and the uploading of consumer-generated classified ads to be viewed as TV classified ads. However, many other types of video content may be used in programming with this system.

Figure 1A:
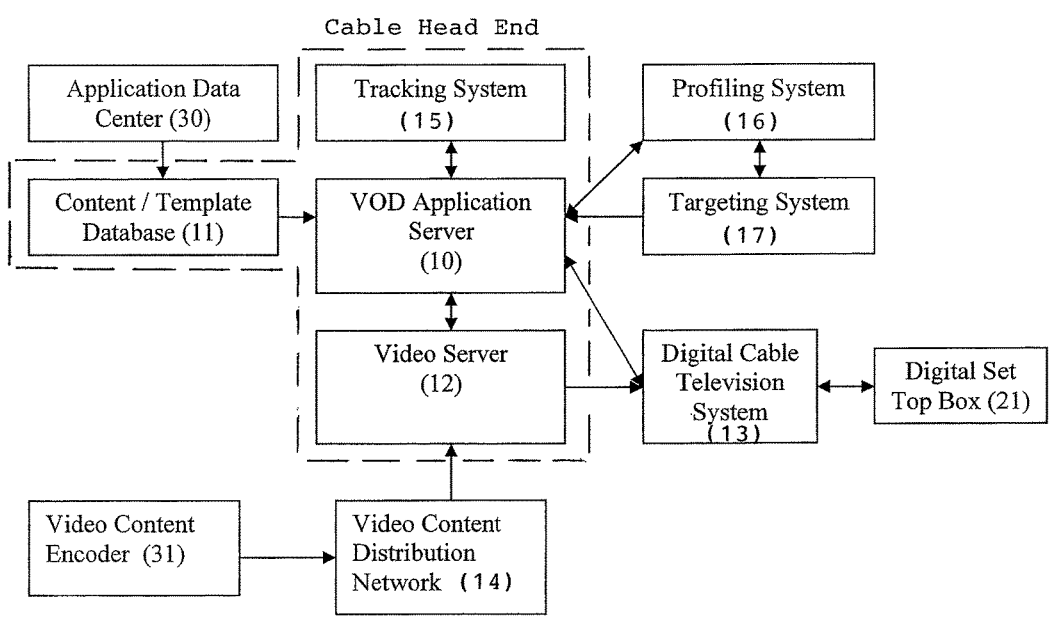
FIG. 1A is a diagram of an overall architecture for a VOD Content Delivery System in accordance with the present invention.

Referring to FIG. 1A, an overall system architecture for a VOD content delivery system includes a VOD Application Server 10 located at a Cable Head End. The VOD Application Server 10 manages a Database 11 of templates and video content segments from Video Server 12 for generating templatized VOD content. The VOD content is generated in response to a viewer request signal transmitted from the Digital Set Top Box 21 of a viewer's TV equipment through the Digital Cable Television System 13 to the VOD Application Server 10 at the Cable Head End. The VOD Application Server 10 may be of the type which enables any compatibly-developed VOD applications to be loaded on and operated on the server. An example of such a VOD Application Server is the Navic N-Band™ server, offered by Navic Systems, Inc., d/b/a Navic Networks, of Needham, Mass. This is an integrated system which provides an application development platform for third party application developers to develop new VOD service applications, viewer interfaces, and ancillary interactive services for deployment on VOD channels of CATV operators in cable service areas throughout the U.S. A detailed description of the Navic N-Band system is contained in U.S. Patent Application 2002/066,106, filed on May 30, 2002, which is incorporated herein by reference.

Templates for displaying VOD content are created at an Application Data Center 30 and stored in the Database 11 for use by the operative VOD application. The templates may be designed, for example, to present video ad content displays in a logo frame, or to provide navigation buttons and viewer selection options in a frame around currently displayed video content. In the preferred embodiment described in greater detail below, the templates are used to provide navigation aids in a series of progressively more focused ad display types. A Video Content Encoder 31 is used to encode raw video feeds into formatted video content segments compatible with the VOD platform and supply them through a Video Content Distribution Network 14 to the Video Server 12.

In operation, the VOD Application Server 10 operates a VOD application for the CATV system, for example, "automobile infomercials on demand". The viewer sends a request for selected VOD content, such as to see an infomercial on a specific model type made by a specific auto manufacturer, by actuating a viewer request signal by a key press on the viewer's remote control unit transmitting an IR signal to the Set Top Box 21 that is sent on a back channel of the Digital Cable Television System 13 to the VOD Application Server 10 at the Cable Head End. In response to the signal, the VOD Application Server 10 determines the VOD content being requested and retrieves the infomercial ad display template from the Template Database 11 and video content segment from the Video Server 12, in order to generate the corresponding templatized VOD content. In the invention, the templates are of different types ordered in a hierarchy, and display of content in a template of a higher order includes links the viewer can select to content of a lower order in the hierarchy. Upon selecting a link using the remote control, the VOD Application Server 10 retrieves the template and video content of lower order and displays it to the viewer. Each successive templatized display may have further links to successively lower levels of content in the hierarchy, such that the viewer can use the series of linked templatized VOD displays as a "drill-down navigation" method to find specific end content of interest.

Figure 1B:
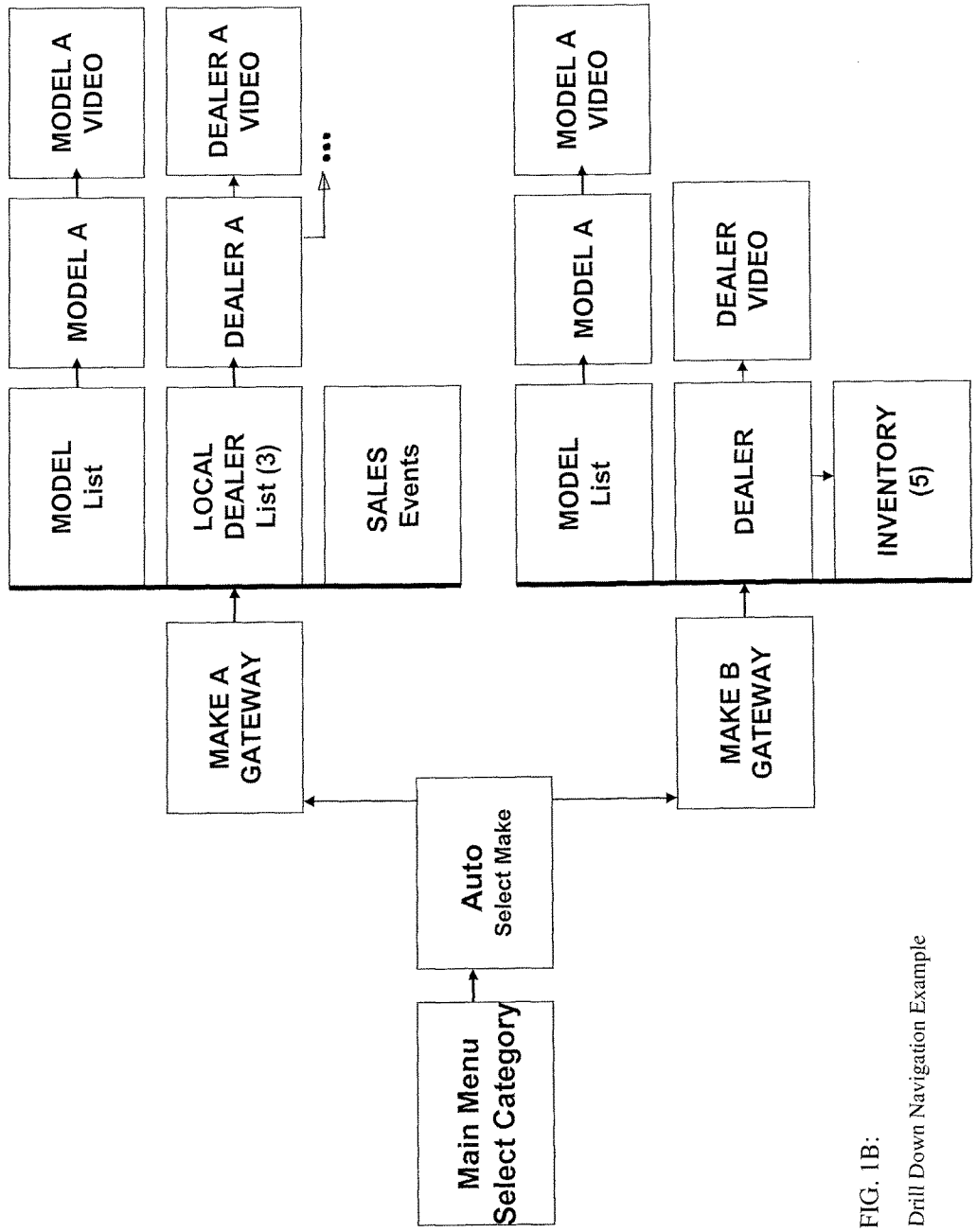
FIG. 1B shows an example of templatized Drill-Down Ad navigation.

Referring to FIG. 1B, a preferred embodiment of the templatized VOD content delivery system is shown providing a User Interface using Drill-Down Navigation through display ads, such as for automobile infomercials. When the viewer selects a VOD application (channel), such as "Wheels-On-Demand", the viewer's TV displays a Main Menu with buttons inviting the viewer to "Select Category". The viewer can select an "Auto" category, and the TV then displays an "Auto" menu with buttons inviting the viewer to "Select Make", such as Make A, Make B, etc. When the viewer makes a selection, such as Make A, the viewer's TV displays a further menu that is a Gateway into templatized VOD content delivery which enables Drill-Down Navigation by templatized display ads. Through the Gateway, the VOD Application leaves the Menu mode and enters the Drill Down Navigation mode for successively displays of hierarchically-ordered video content which allow the viewer to navigate to progressively more focused content. In this example, the highest level of the hierarchy includes categories for Model, Local Dealer, Sales Events, and/or Inventory. When the viewer selects a category such as "Model" from the Gateway, for example, the VOD Application creates a templatized ad display showing video content generic to all models by that automaker framed in a frame which has links (buttons or choices) for a list of the specific models made by that automaker. When the viewer selects the link to a specific model, "Model A" for example, the VOD Application creates a templatized ad display showing video content for Model A, and the viewer can then choose to run a long-form infomercial of the Model A video. Alternatively, the Drill-Down Navigation can continue with further levels of specificity, such as "Custom Packages", "Options", "Colors/Stylings", etc. Similarly, the selection of the "Local Dealer" category from the Gateway can bring up a templatized ad for local dealers with links to specific local dealers in the viewer's cable service area, and a click on a specific "Dealer A" can bring up a templatized ad for Dealer A with further links to more specific content pertaining to Dealer A, such as "Current Sales Promotions", etc.

In this manner, the templatized VOD content delivery system allows the viewer to navigate to specific content of high interest to the viewer using the Drill-Down ads as a navigation tool, while at the same time having a unique visual experience of moving through a series of ads mirroring the viewer's path to the subject of interest. The templatized VOD ads are generated dynamically by searching the Content/Template database with each request by a viewer, enabling the system to display updated navigation choices and content simply by updating the database with updated links and video content. For example, if the Auto Maker changes the Model types of autos currently available, or if Local Dealer A changes its current sales promotions for autos currently available, that advertiser's ads can be updated with new, template frame navigation links and content, instead of entirely new ads or screen displays having to be shot, produced, contracted, delivered, and programmed with the cable TV company. Many other types of layered or indepth ads, subjects, and interactive TV applications can be enabled with the use of the Drill-Down Navigation method. The selections or preferences exhibited by viewer navigation paths through the Drill-Down Navigation can also be tracked, profiled, and/or targeted as feedback data to advertisers for fine-tuning Drill-Down Navigation designs.

Figure 1C:
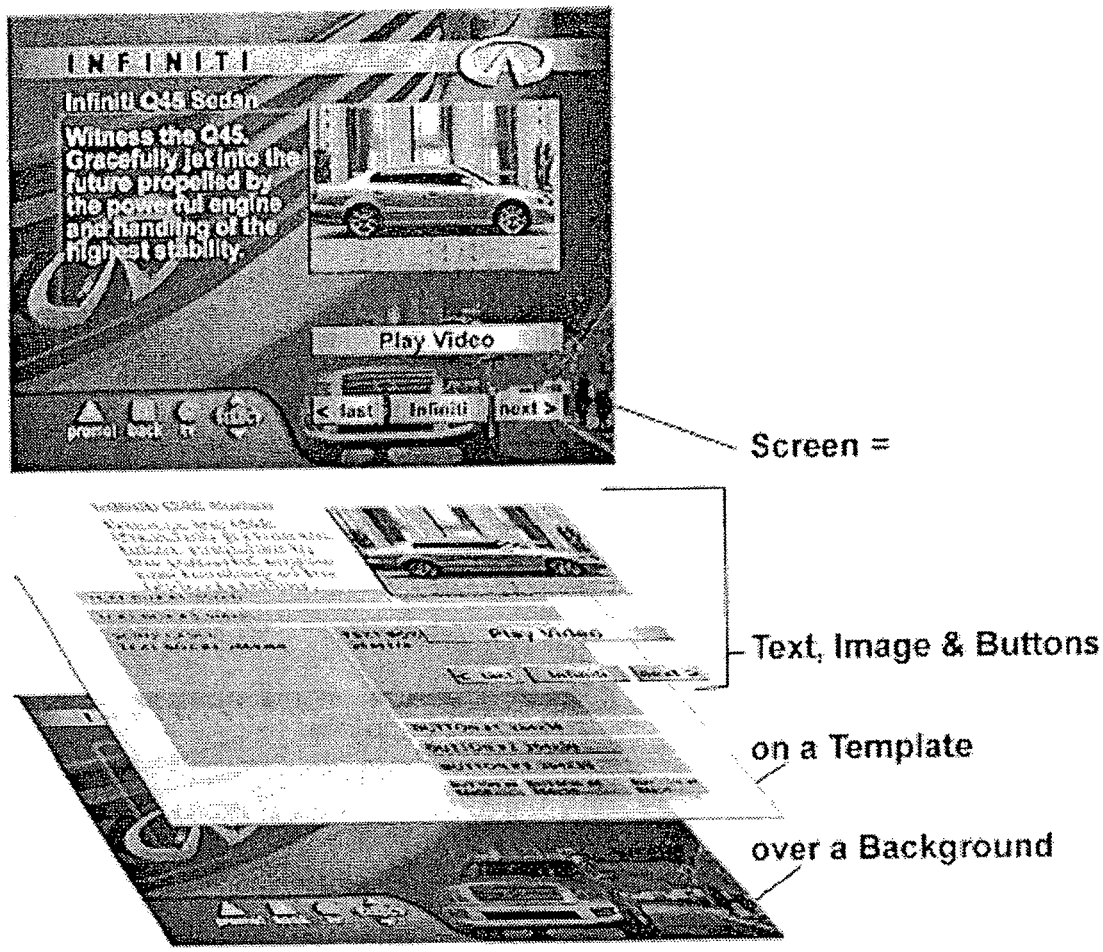
FIG. 1C shows an example of the templatized ad display model.

In FIG. 1C, an example illustrates how a templatized VOD display is generated in layers. A Background screen provides a basic color, logo, or graphical theme to the display. A selected Template (display frame) appropriate to the navigation level the intended display resides on is layered on the Background. The Template typically has a frame in which defined areas are reserved for text, display image(s), and navigation links (buttons). Finally, the desired content constituted by associated Text, Image & Buttons is retrieved from the database and layered on the Template. The resulting screen display shows the combined background logo or theme, navigation frame, and text, video images, and buttons Referring again to FIG. 1A, a Tracking System 15 of conventional type can be installed at the Cable Head End to aggregate non-personal data on what channels and programs viewers watch. For the Drill Down Navigation method, the Tracking System 15 can include tracking of the navigation paths viewers use to find subjects of interest in a VOD Application. The aggregation of viewer navigation data can indicate what subjects are most popular, whether some subjects are of greater interest to viewers at certain times of day, of certain demographics, or in relation to certain products or services. The VOD Application Server 10 can export the aggregated viewer navigation data to an external Profiling System 16, such as a non-biased or unrelated firm applying profile analysis methods. The results of the Profiling System 16 can be communicated to a Targeting System 17, such as a template design firm or content production company, to fine-tune the presentation of the templatized VOD content consistent with viewer preferences or interests. The feedback from the Targeting System can be supplied as feedback to the VOD Application Server to modify the Content/Template Database 11.

Another application for the templatized VOD content delivery system can be developed to support video advertisements which link national to local market ad campaigns in "drill-down" fashion. Advertisers, both national and local, can pay for placement of their video advertisements on the system. When the VOD Application is run, the national ads are displayed as a Gateway to linking to the local market ads. In this manner, national ads can be used to transition viewers from general interest in a product to finding specific information about the product available locally.

The templatized VOD content delivery system can also support "traffic building" videos, including music videos, that may not generate direct revenue. Once a video is encoded and registered into the system, the management and distribution of the video is conducted through software systems and automated controls. The User Interface provides the user with the ability to navigate and find desired video content. Selection of a category presents the user with a list of video titles available for playback. Categories and title lists can be generated using real-time database queries, allowing for database-driven management of content within the User Interface. The User Interface can also support a search interface which allows the user to search the video content database to generate a list of video titles with specific characteristics.

Figure 2A:
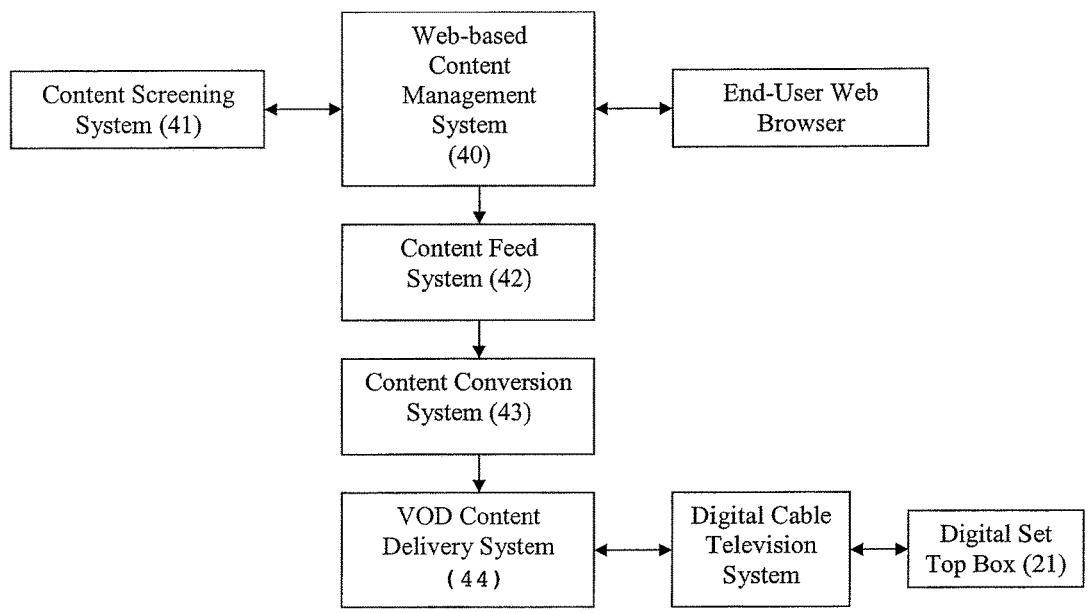
FIG. 2A is a process flow diagram of the overall architecture of a Classified Ad application for the VOD Content Delivery System.

As another aspect of the present invention, a VOD content delivery system may be adapted to offer consumer-generated classified ads on TV. The VOD content delivery system is provided with a Content Management frontend to receive consumer input and convert it to video display ads maintained in the system database. Referring to FIG. 2A, a system for managing, converting and displaying individual consumer-generated ads on a VOD content delivery system has a Web-based Content Management System 40 for enabling an individual user to upload content from their computer via a web browser to display a consumer-generated video ad on TV. The uploaded content includes meta data for classifying the video ad by title and topical area(s). A Content Screening System 41 is used for screening the content input by the individual user, such as by performing automatic searching for objectionable text, audio, video and/or images and rejecting the content if found objectionable.

A Content Feed System 42 is used to automatically transfer consumer-generated content screened through the Content Screening System 41 to a Content Conversion System 43. This system automatically converts the consumer-generated content supplied by the Content Feed System 42 into video display format compatible with the VOD content delivery system. The converted video ad is indexed by title and classified topical areas according to the meta data supplied by the user, in accordance with the indexing system maintained by the Content Management System. The VOD Content Delivery System 44 operates a Classified Ads VOD Application in which menus for finding classified ads are navigated by viewers, and specific classified ads are delivered through the Digital Cable Television System for display as video ads on the viewer's TV equipment in response to viewer request input by remote control to the Digital Set Top Box 21, as described previously with respect to the operation of the general VOD platform.

Figure 2B:
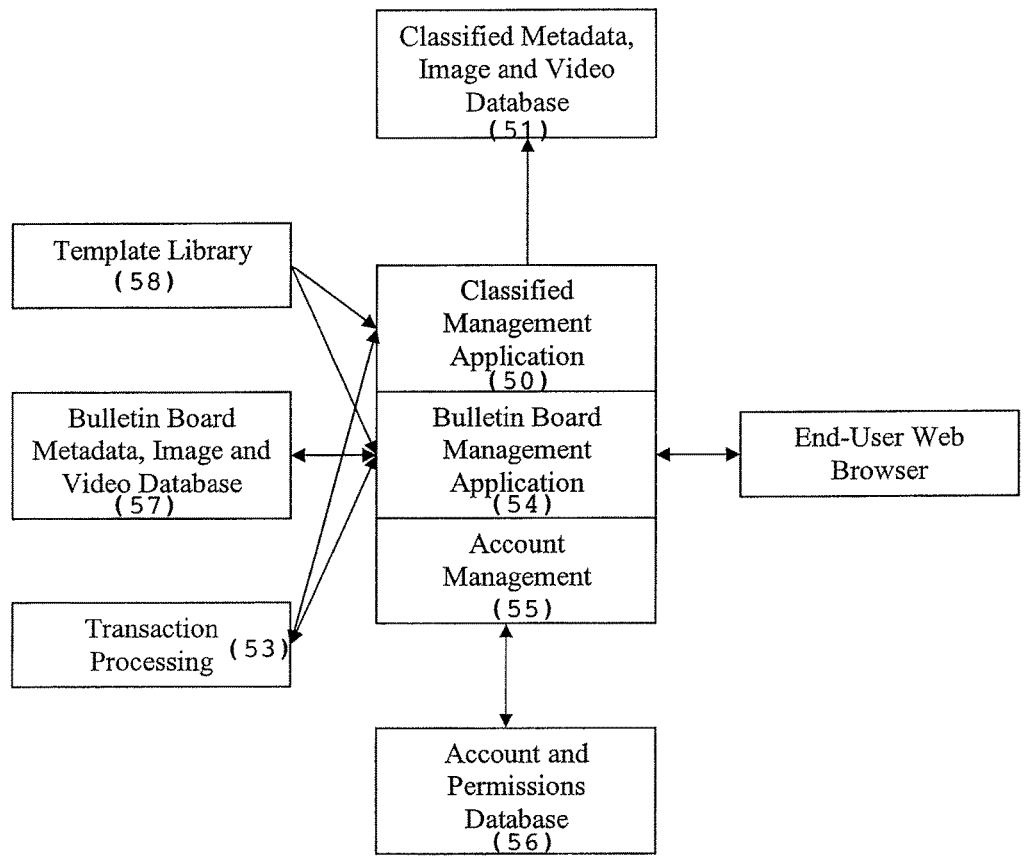
FIG. 2B illustrates a Content Management Website for the Classified Ad application.

Referring to FIG. 2B, the Web-based Content Management System 40 includes a plurality of functional components to allow consumers to create and manage their own classified ads as interactive television content, as well as pay for the distribution of their content within the digital cable television system. A Classified Management Application 50 is used to receive consumer-input content, have it screened (by the Content Screening System 41, not shown), and store it in the Classified Metadata, Image and Video Database 51. Consumer payment for running video ads is handled by the Transaction Processing Component 53. Also included in the Content Management System is an Account Management Component 55 and Account & Permissions Database 56 for management of user accounts for use of the web-based TV Classified Ads system. A Bulletin Board Ads application may be operated in parallel with the TV Classified Ads application. A Bulletin Board Management Application 54 and Database 57 enable the creation and management of consumer-generated content relating to public announcements and other items of general interest for groups, organizations or topics. The preferred VOD Content Delivery System uses templatized VOD content, and a Template Library 58 is used to store templates for both the Classified Ads and Bulletin Board Ads applications.

The Account Management Component controls the access by persons to the web-based Content Management System. The Account Management Component identifies persons accessing the system for the first time and allows these persons to register and create an account by providing an account name, password, credit card information and other information required for the payment of fees. The Account Management Component controls the access by registered users to their accounts and manages the privileges and security associated to all accounts. Persons may create accounts for the creation and management of Classified Ads. Accounts capable of accessing the Bulletin Board Management Application may also be assigned by a system administrator in the Account Management Component. Any account capable of accessing the Bulletin Board application can then create and manage bulletin board ads for the assigned bulletin boards.

The Classified Content Management System enables users to upload text, audio, video, and/or image files for classified ads in industry-standard file formats and have it converted into video display ads compatible with the VOD Content Delivery System. Classified ads are searched on the viewer's TV equipment by menus and lists indexed by title and topical areas corresponding to the metadata associated with the classified ads content. Selection of a listed item results in the display of a TV display ad containing uploaded text, images, video and/or audio. Users pay listing fees to the operator of the system for maintaining and displaying the classified ads on the digital cable television system.

Significant features of the Classified Ads Content Management System include: (a) the ability to enter descriptive data and text regarding the item; (b) uploading digital images of the item to the Content Management System; (c) uploading digital video of the item to the Content Management System; (d) uploading digital audio regarding the item to the Content Management System; (e) automated size and resolution processing of digital images uploaded to the system; (f) automated digital format conversion of digital video uploaded to the system; (g) automated digital format conversion of digital audio uploaded to the system; (h) ability for users to select an interactive television screen design (template) from a catalog of available templates; (i) ability to view on a web browser the interactive television template containing the consumer-provided content; (j) ability to save classified content in persistent memory or storage for subsequent modification; (k) ability to mark classified content as completed and ready for submission to the interactive television system; (l) ability to specify the date and time when a classified content item is to become accessible by users of the interactive television system and the data and time when a classified content item is to be removed from display on the interactive television system; (m) ability to notify the user through email or other communication system that a specific content item is scheduled to be displayed or removed from the interactive television system; (n) ability to modify and resubmit previously created classified content for display on the interactive television system; (o) ability to access viewing data generated by the Tracking System regarding access and use of specific consumer-generated content by users of the interactive television system; and (p) ability to calculate fees for classified content and submit payment of the fees using the Transaction Processing system.

As noted in (i) above, the Classified Content Management System allows the user to view the content they have composed using the templates. The templates are designed specifically for use on interactive television systems and the user is able to view on the web-interface their content as composed for presentation on television. As noted in (j) above, the Classified Content Management System allows the persistent storage of classified content; although the user is composing interactive television pages using a template system, the content is persistently stored as individual elements to simplify changes by the user and to allow the conversion of the content to different formats as required by different interactive television systems.

The Bulletin Board Content Management System provides the users of the web-based Content Management System with content creation and content management tools for the creation and maintenance of consumer-generated content related to announcements and other informational items of general interest. Bulletin Board content is displayed on the interactive television system as dedicated interactive television screens (bulletin boards), where approved groups, organizations or topics are each assigned a bulletin board for the display of their information. Bulletin Board content is displayed as list items organized within a bulletin board; selection of a list item results in the display of an interactive television screen containing or providing access to the descriptive data, text, images, video and audio regarding the item.

An alternative implementation of a Bulletin Board can display the content as scrolling text, where the user scrolls through the text, or the text scrolls automatically. Bulletin Board accounts will pay fees determined by the operator of the system for the distribution of the bulletin board content on the interactive television system for display on the digital cable television system. Significant features of the Bulletin Board Content Management System include: (a) the ability to enter descriptive data and text regarding the item; (b) upload digital images to the content management; (c) upload digital video to the content management system; (d) upload digital audio to the content management system; (e) automated size and resolution processing of digital images uploaded to the system; (f) automated digital format conversion of digital video uploaded to the system; (g) automated digital format conversion of digital audio uploaded to the system; (h) ability for users to select an interactive television screen design (template) from a catalog of available templates; (i) ability to view on a web browser the interactive television template containing the consumer-provided bulletin board content; (j) ability to save bulletin board content in persistent memory or storage for subsequent modification; (k) ability to mark bulletin board content as completed and ready for submission to the interactive television system; (l) ability to specify the date and time when specific bulletin board content is to become accessible by users of the interactive television system and the data and time when specific bulletin board content is to be removed from display on the interactive television system; (m) ability to notify the user through email or other communication system that specific bulletin board content is scheduled to be displayed or removed from the interactive television system; (n) ability to modify and resubmit previously created bulletin board content for display on the interactive television system; (o) ability to access viewing data generated by the Tracking System regarding access and use of specific bulletin board content by users of the interactive television system; and (p) ability to calculate fees for bulletin board content and submit payment of the fees in conjunction with the Transaction Processing component.

The Transaction Processing component allows users of the Classified Content Management System and Bulletin Board Content Management System to determine and pay for any fees resulting from their use of these systems. The Transaction Processing component will allow users to pay for fees using credit cards or other supported payment methods. Significant features of the Transaction Processing component include: (a) ability to maintain business rules for use by the Transaction Processing system to determine fees based on user type and content type; (b) ability to maintain business rules for one or more payment methods for use by the Transaction Processing system in handling the settlement of fees; (c) ability to maintain business rules for user account and payment settlement conditions such as delinquency and lack-of-credit for use by the Transaction Processing system in determining user account privileges and content status; and, (d) ability to process payment of fees in real-time for payment methods that support real-time settlement.

Figure 2C:
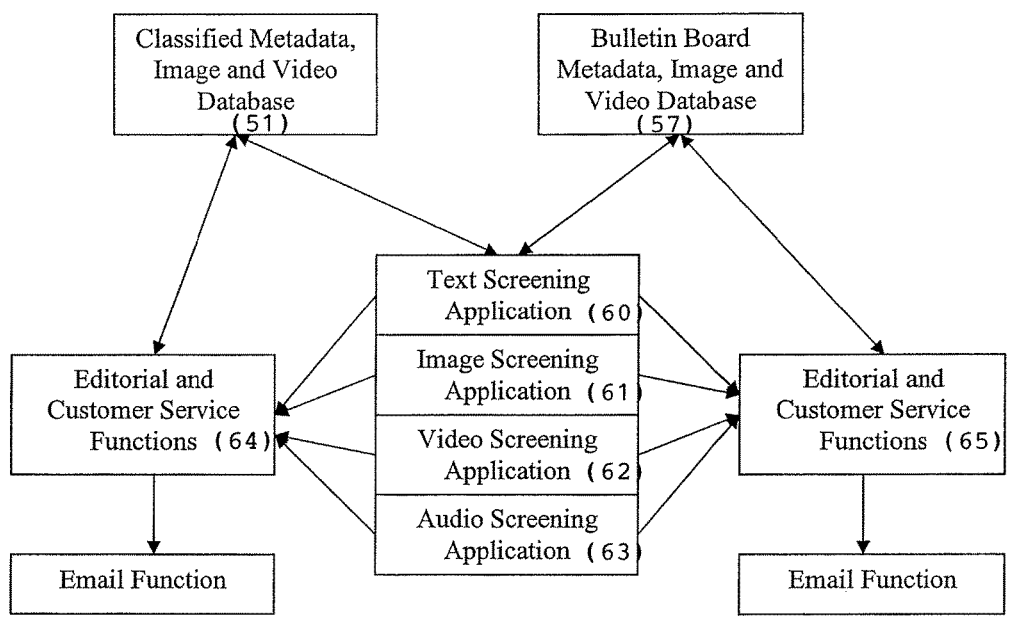
FIG. 2C illustrates a Content Screening Component of the system.

Referring to FIG. 2C, the Content Screening System (41) is comprised of a Text Screening Application 60 which searches for objectionable words or phrases, an Image Screening Application 61 which searches for objectionable graphic images, a Video Screening Application 62 which searches for objectionable images or audio words or phrases in video segments, and an Audio Screening Application 63 which searches for objectionable words or phrases in audio segments. The Content Screening System can be used for both Classified Ads content and Bulletin Board content. Content that has been screened by the Content Screening System is then transferred to the aforementioned Classified Ads Database 51 or the Bulletin Board Content Database 57. The system also has component 64 for Editorial and Customer Service Functions for Classified Ads, and component 65 similarly for Bulletin Board content. These can each include an Email Function to send confirmations of input, reasons for rejection of posting, suggested corrections, further processing, and posting of content to consumers using the system.

Significant features of the Content Screening System include: (a) ability to maintain a library of objectionable or illegal words and phrases for use in the screening of text; (b) ability to perform automated analysis of user content text using the text library as an input and alert system administration personnel to the use of objectionable or illegal content and the use of unknown and suspect words or phrases; (c) ability to maintain a library of objectionable or illegal image elements for use in the screening of images; (d) ability to perform automated image recognition analysis against user content images using the library of image elements as an input and alert system administration personnel to the use of objectionable or illegal content; (e) ability to maintain a library of objectionable or illegal image elements for use in the screening of video; (f) ability to perform automated image recognition analysis against user content video using the library of image elements as an input and alert system administration personnel to the use of objectionable or illegal content; (g) ability to maintain a library of objectionable or illegal audio elements for use in the screening of audio; (h) ability to perform automated audio analysis against user content audio using the library of audio elements as an input and alert system administration personnel to the use of objectionable or illegal content; and (i) ability to save screened content in persistent memory or storage for subsequent processing. Content Screening is automatically performed with the Content Management System 40 during the user process of submitting and/or creating consumer-generated content or may be performed as a process subsequent to the creation of content by the user.

Figure 2D:
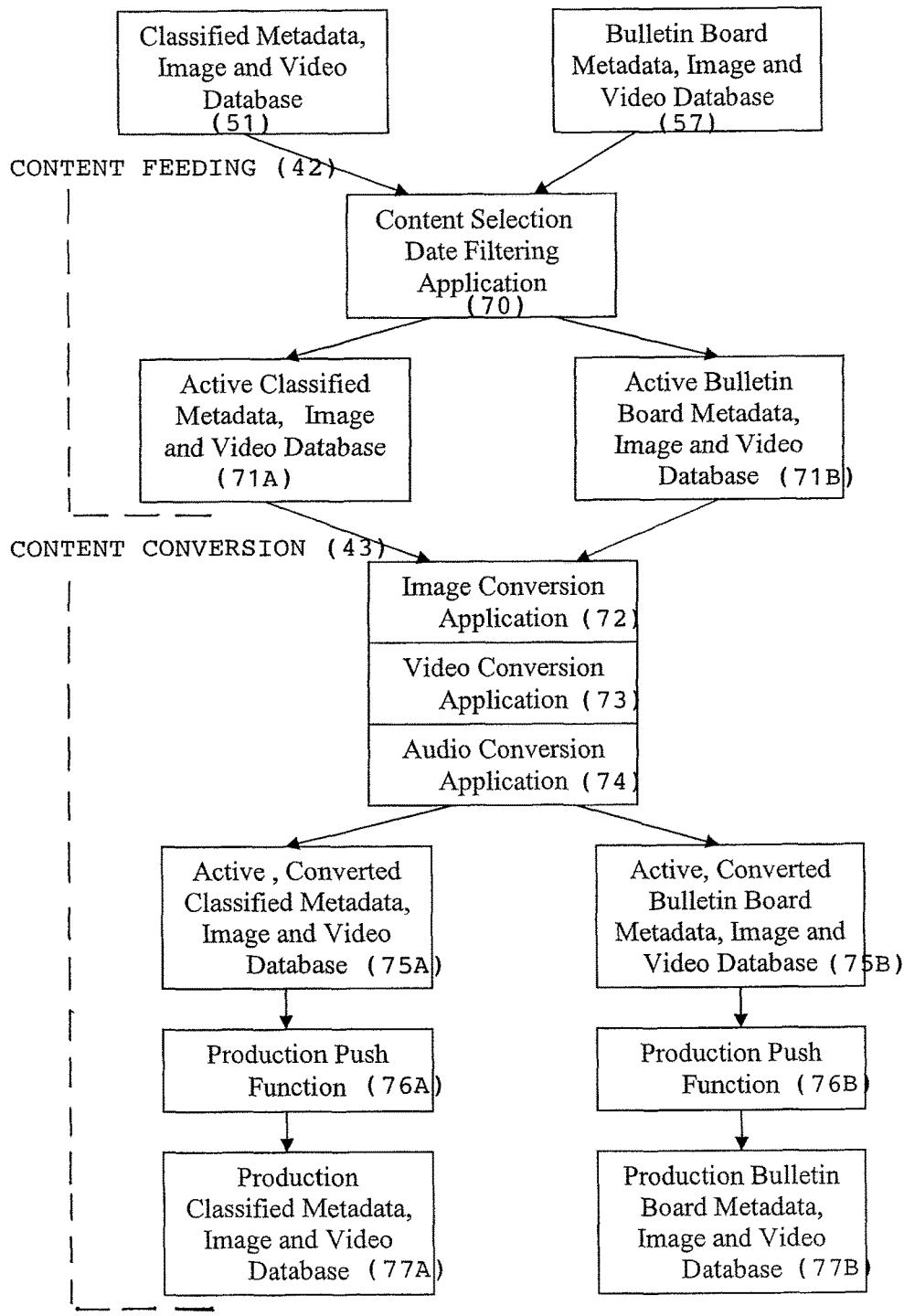
FIG. 2D illustrates a Content Feed and Conversion Components of the system.

Referring to FIG. 2D, the Content Feed System 42 and the Content Conversion System 43 provide for the transfer of user content from the Content Screening System and conversion to video content format compatible with the VOD Content Delivery System 44. The Content Feed System 42 has a Content Selection/Date Filtering Application which selects consumer-generated content uploaded to the system that is within the dates contracted for posting and display of the content as Classified Ads or on Bulletin Boards. Content within the active date range is transferred to the Active Classified Ads Database 71A or the Active Bulletin Board Database 71B.

The Content Conversion System receives consumer-generated content in industry-standard formats or created in viewable format (HTML) on the web-based input system and converts the content into formats compatible with the VOD Content Delivery System and for display on viewers' televisions. The Content Conversion System 43 has an Image Conversion Application 72 which converts consumer-uploaded image files (in industry-standard formats such as JPEG, GIF, TIFF, BMP, PDF, PPT, etc.) into VOD content format, a Video Conversion Application 73 which converts consumer-uploaded video files into VOD content format, and an Audio Conversion Application 74 which converts consumer-uploaded audio files into VOD content format. Content converted to VOD content format is stored in the Active Converted Classified Ads Database 75A or the Active Converted Bulletin Board Database 75B. The content is subject to a further Production Push Function 76A, 76B and stored in the Production Classified Ads Database 77A or the Production Bulletin Board Database 77B, if any presentation formatting, date stamping, template framing, or other system editing is required by the system.

Significant features of the Content Feed System include: (a) ability to select user content for submission to the Content Conversion System through the testing of appropriate parameters including the date and time information contained in the user content; (b) ability to appropriately package the elements of the user content to permit the efficient transfer of these content elements to the Content Conversion System through an Application Program Interface or other interface; (c) ability to create, maintain and execute a schedule for when the Content Feed System will execute on an automatic basis for the automatic transfer of consumer-generated content to the Content Conversion System; and, (d) ability to execute the functions of the Content Feed System on a manual basis in the presence or absence of a schedule. The Content Feed System may be able to package and distribute content to single or multiple Content Conversion Systems.

Significant features of the Content Conversion system include: (a) ability to receive content packages delivered by the Content Feed System through an Application Program Interface or other interface; (b) ability to process the elements of consumer-generated content into data, text, graphic, video and audio elements that are compatible with the interactive television system and maintain the content presentation created by the user on the web-based Content Management System; (c) ability to save reformatted content in persistent memory or storage for subsequent distribution and use by the interactive television system; and, (d) ability to inform the interactive television system that consumer-generated content is available for distribution and use. The Content Conversion System may be added as a component system of the VOD Content Delivery System, or it may be implemented as a wholly separate system that connects to the VOD Content Delivery System through an Application Program Interface or other interface. When implemented as a system that is separate from the VOD Content Delivery System, it is possible to support multiple, different interactive television systems by either (a) incorporating multiple formatting requirements into a single instance of the Content Conversion System or (b) creating multiple Content Conversion Systems, each supporting the formatting requirements for a specific interactive television system. Either implementation allows for a single instance of consumer-generated content that is created and maintained using the web-based Content Management System to be distributed and displayed on multiple, different interactive television systems with different formatting requirements.

The VOD Content Delivery System 44, as described previously, provides for the distribution of screened, converted, properly formatted consumer-generated content to viewers' televisions, typically through the use of digital set-top boxes connected to a digital cable television system capable of supporting real-time two-way data transfer between the set-top box and the Cable Head End. Significant features of the VOD Content Delivery System include: (a) ability to receive properly formatted content from the Content Conversion System; (b) ability to distribute said content over a digital cable television system and display this content on television as an interactive television presentation; (c) ability to receive user commands generated by an infrared remote control device, keyboard or other device; (d) ability to respond to the user commands by displaying appropriate content or executing desired functionality; and, (e) ability to generate and collect data regarding the user sessions and the viewing data regarding consumer-generated content on the interactive television system and make this data accessible to the Tracking System. The VOD Content Delivery System can employ templatized VOD content delivery, as described previously with respect to FIG. 1A, enabling use of the Drill Down Navigation method in which viewers can navigate visually through classified ad hierarchical categories to specific titles or content.

The VOD Content Delivery System for the Classified Ads application can also employ the Tracking System 15 for the collection and consolidation of viewing data generated by the interactive television system and the generation of reports against this viewing data. For example, the Tracking System can track the number of viewer requests for viewing that a classified ad received in a given period and calculate billing charges accordingly. The Tracking System can make this information available to users of the Content Management System as well as to system administrative personnel performing general analysis of interactive television services and associated content. Significant features of the Tracking System include: (a) ability to access and process the data generated by the Classified Ads application; (b) ability to form summaries of the viewing data against desired parameters; (c) ability to save data, summaries and reports in persistent memory or storage for subsequent modification or access; (d) ability to make data, summaries and reports accessible by users of the web-based Content Management System, restricting the data accessible by any specific user to data regarding the content created by that user account on the Content Management System; and, (e) ability to make data, summaries and reports accessible by to system administration personnel.

As another aspect of the present invention, implementation of a VOD content delivery system can be made on any digital television system that supports real-time two-way data transfer and interactivity between the digital Set Top Box and application servers and VOD servers located at headends or other service points within the television system network. An alternative digital television system of increasing importance in the marketplace is Internet Protocol Television (IPTV). IPTV is a system for delivering video content, both broadcast and Video on Demand, to digital set top boxes and other devices. IPTV and digital cable both transmit digital video in packetized data streams within closed, proprietary broadband systems; however, IPTV uses Internet Protocol (IP) to structure, route and deliver the digital video packets within an IPTV system.

Figure 3:
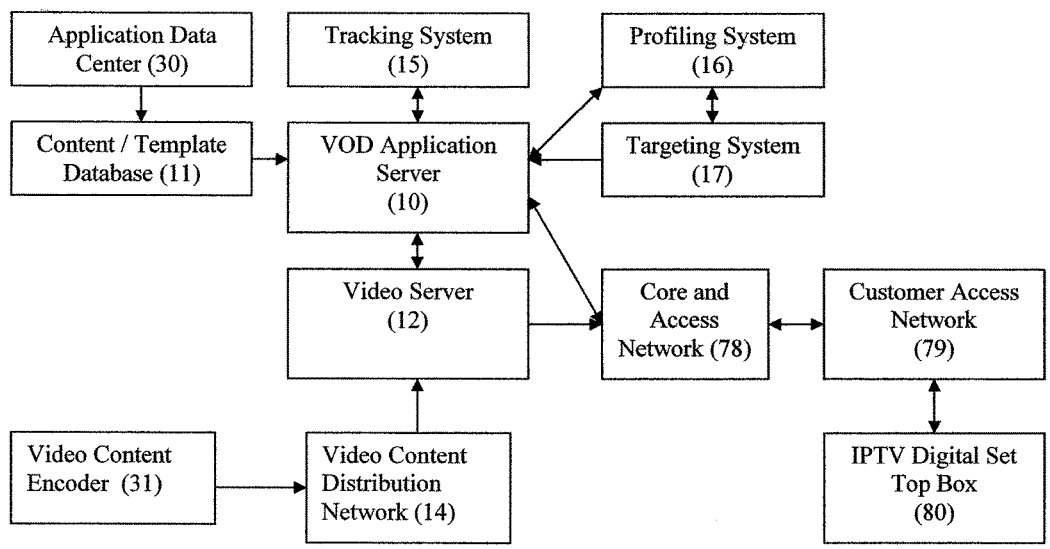
FIG. 3 is a diagram of a VOD Content Delivery System adapted to Internet Protocol TV (IPTV) system.

Referring to FIG. 3, an alternative implementation for a VOD content delivery system is illustrated for an IPTV system. The components of the VOD content delivery system listed in the figure are similar to those in FIG. 1A. However, FIG. 3 illustrates the terminology and network architecture of an IPTV system as used for the purposes of this invention. The VOD Application Server 10, Content/Template Database 11, Video Server 12 and Tracking System 15 are located in the IPTV Service Node; the IPTV Service Node is equivalent to the Cable Headend in FIG. 1A. Systems external to the IPTV Service Node such as the Application Data Center 30, Profiling System 16, Targeting System 17 and Video Content Distribution Network 14 connect to their associated VOD Content Delivery System components housed within the IPTV Service Node in manners similar to those used in a digital cable system implementation. IPTV systems can use multiple network technologies within their closed, proprietary broadband network. Core and Access Network 78 are high-bandwidth networks connecting IPTV Service Nodes in order to support the central transport of video streams. The Core and Access Network 78 feed the Customer Access Network 79, which supports the physical network connection into the customer premise and connects to the IPTV Digital Set Top Box 80. The combination of the Core and Access Network 78 and Customer Access Network 79 is the functional equivalent of the Digital Cable Television System 13 in FIG. 1A.

In operation, the VOD Content Delivery System implementation for IPTV is identical to the digital cable implementation. The VOD Application Server 10 operates a VOD application for the IPTV system, for example, "automobile infomercials on demand". The viewer sends a request for selected VOD content, such as to see an infomercial on a specific model type made by a specific auto manufacturer, by actuating a viewer request signal by a key press on the viewer's remote control unit transmitting an IR signal to the IPTV Digital Set Top Box 80 that is sent on as IP-encapsulated message through the IPTV System to the VOD Application Server 10 at the IPTV Service Node. In response to the signal, the VOD Application Server 10 determines the VOD content being requested and retrieves the infomercial ad display template from the Template Database 11 and video content segment from the Video Server 12, in order to generate the corresponding templatized VOD content. In the invention, the templates are of different types ordered in a hierarchy, and display of content in a template of a higher order includes links the viewer can select to content of a lower order in the hierarchy. Upon selecting a link using the remote control, the VOD Application Server 10 retrieves the template and video content of lower order and displays it to the viewer. Each successive templatized display may have further links to successively lower levels of content in the hierarchy, such that the viewer can use the series of linked templatized VOD displays as a "drill-down navigation" method to find specific end content of interest.

Similarly, all previously mentioned adaptations of the VOD Content Delivery System implementation for digital cable, such as Classified Ads and Bulletin Boards, are supported identically on IPTV implementations.

Wide Ranging Content Uploadable Via Internet to Digital TV VOD Platform

In the foregoing description, the uploading, management, conversion, and display of content uploaded from the Internet for viewing on a VOD platform was described for an embodiment in which consumer-generated classified ads and other TV-displayable information of interest are uploaded via Internet for conversion and display as video programs on cable TV infrastructure. Even further, the principles of the invention are applicable to a wide range of other content uploadable on the Internet and to other types of digital television service providers such as DSL telephone lines, local area broadband networks, and wireless broadband networks. In the following description, another exemplary embodiment of the present invention is described with respect to uploading wide ranging content via Internet for viewing on the VOD platforms of any type of digital TV system.

Figure 4:
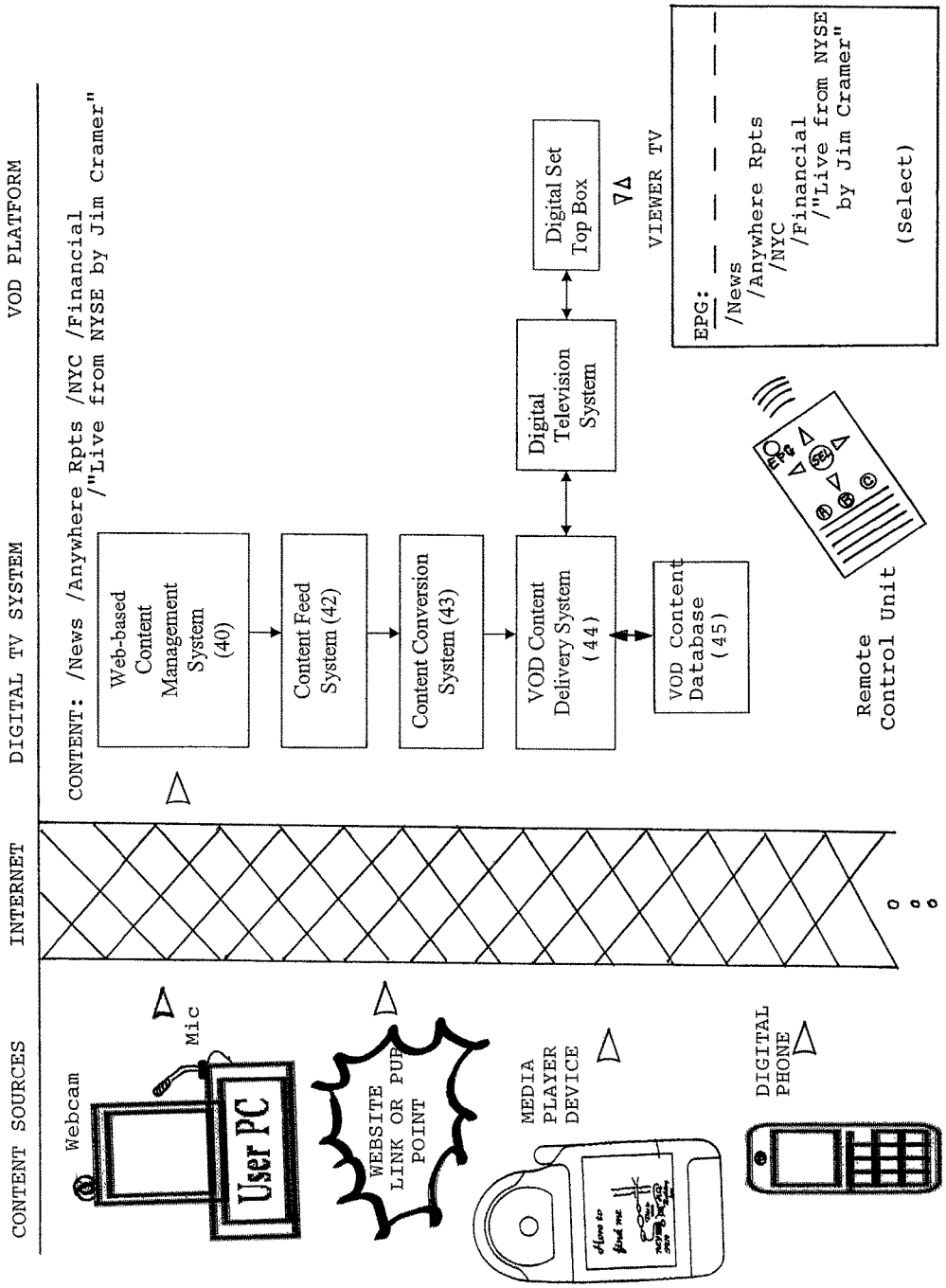
FIG. 4 is a diagram illustrating a process flow for enabling content publishers on the Internet to upload video content to digital television service providers for viewing on the home TV.

Referring to FIG. 4, informational/media content from any Content Source can be uploaded via Internet to a Digital TV System for placement on its Video-on-Demand (VOD) Platform to be viewable as TV programs on Viewers' TVs by selection from an Electronic Program Guide (EPG) transmitted via the viewer's Set Top Box for display on the TV. Content is uploaded by an author or publisher to the Web-based Content Management System 40, which processes the content through a Content Feed System 42 and Content Conversion System 43 (from standard digital data formats to TV video format) to the VOD Content Delivery System 44 where it is stored in its associated Video Content Database 45 for retrieval upon viewer request. Uploaded TV programs are offered to viewers by listing them on the EPG, and upon viewer selection via the Set Top Box, are delivered via the Digital TV System infrastructure.

For VOD platforms, an EPG is typically presented to viewers as a program guide displayed on the TV for finding a title of interest associated with that particular VOD channel. The EPG display typically starts with a top level menu offering broad categories of content, e.g., Movies, Documentaries, TV Shows, News, Sports, Community Events, Self-Help, Infomercials, etc. The viewer can cursor through the categories and select a category by moving the cursor to a desired category title, such as "News", and clicking the "Select" key on the remote control unit. The EPG then brings up the next display of subcategories available in the selected category. For the "News" category, it might display subcategories of "ABC", "NBC", "CBS", "CNN", "MSNBC", "Anywhere Reports", etc. Upon selecting "Anywhere Reports", the EPG would then display the next level of subcategories down, e.g., "San Francisco", "Los Angeles", "Denver", "Dallas", "Chicago", "Boston", "New York", "D.C.", etc. This sequence continues until the viewer selects a program title or exits the EPG.

The EPGs for VOD "channels" thus use program guide displays on the TV which are in a structured hierarchy to allow the viewer to navigate to a program title of interest. Upon selecting the title, a data return associated with that title is sent from the set-top box as a request to the VOD platform for the program associated with that title. The EPG database of the VOD platform maintains an index linking the program titles to the addresses in the VOD Content Database 45 where the respective programs are stored. Upon receiving a request of a program title from the set-top box, the VOD Content Delivery System 40 retrieves the corresponding video content from the Database and transmits it on its broadband network to the set-top box that sent the request. Advanced VOD platforms also have VCR or DVR-like functions that enable a viewer to Pause, Play, Rewind, Fast Forward, and Stop a program using the TV remote control unit.

As more and more video content is offered on VOD platforms of digital TV systems, it may be desirable to dynamically adjust the EPG displays of categories, subcategories, and titles for each viewer so as to minimize the number of remote control keypresses needed to navigate to a program title of interest. Such a system is disclosed in a concurrent continuation-in-part U.S. patent application by the same inventor, entitled "Dynamic Adjustment of Electronic Program Guide Displays Based on Viewer Preferences for Minimizing Navigation in VOD Program Selection", which is incorporated herein by reference.

In the present invention, the EPG hierarchical display structure used in VOD platforms is used as a form of "hierarchical addressing" that uniquely allows viewer navigation to and identifies a program title of interest. This EPG hierarchical addressing scheme can be represented as a string of category term, subcategory term(s), and title that together (as a string delimited by standard character delimiters) uniquely identifying each program offered on the EPG channel. In FIG. 4, for example, the EPG address for a program title on the VOD channel might be represented with a TV (EPG) address as:

TV:/News/Anywhere Reporting/New York/Financial/ "Live from NYSE by Jim Cramer"

The uploaded content may be of any digital media type and come from any web-based source. For the TV viewing environment, content accompanied by video images and voice and/or sound is preferred for presentation as entertainment or recreational viewing. Such content can be generated ubiquitously from any PC computer by an author or publisher using a video or webcam for images and a microphone for audio. The media streams may be edited and composed with a multimedia program, such as Microsoft Windows™ Media, Apple Quicktime™, Macromedia Flash™, and others. Similarly, the content may already be composed as a video program and posted on a website as a downloadable video program via a web link or other URL address. For example, websites like YouTube.com, Brightcove.com, and others have become very popular by offering thousands of self-published video programs by nonprofessional authors and publishers for viewing on the Internet. Such video content may also be uploaded from digital media devices such as iPod™ Video sold by Apple Computer Corp. on which it has already been downloaded from a website. It may also be uploaded from digital phone devices such as iPhone™ sold by Apple which has an on-board camera for video and microphone for sound.

The term "Internet" is intended to include any wide area digital network or network of networks connecting a universe of users via a common or industry-standard (TCP/IP) protocol. Users having a connection to the Internet commonly connect browsers on their computing terminal or device to websites that provide informational content via web servers. The Internet can also be connected to other networks using different data handling protocols through a gateway or system interface, such as wireless gateways using the industry-standard Wireless Application Protocol (WAP) to connect Internet websites to wireless data networks. Wireless data networks are being deployed worldwide and allow users anywhere to connect to the Internet via wireless data devices.

The Digital TV System in FIG. 4 can be of any type that supports video-on-demand programming to TV viewers on any suitable type of VOD platform (infrastructure). While it may be a Cable TV system as described previously, it may be any type of digital TV system providing TV services via a high-speed data connection to the viewer's TV. For example, it may be an Internet Protocol TV (IPTV) system of the type connected to home subscribers via phone DSL lines, cable or other high-speed, high-bitrate connections. As previously described with respect to FIG. 3, the IPTV system can support video-on-demand TV services to TV viewers on a scale that cannot be supported by Internet video websites. The Internet is not an infinitely scalable resource, and placing a burden such as high-bitrate, high definition, full-screen video streams in any significant volume can overwhelm the Internet in its present form. IPTV transmits video programs in digital format using the IP protocol, but instead of transmitting over common Internet connections, it transmits over high-speed, high-bitrate connections that are envisioned to be implemented ultimately as all-fiber optical "last mile" connection to the home.

In the present invention, content can be uploaded (manually or by automatic feed) via the Internet to the Web-based Content Management System 40 of a Digital TV System and automatically converted, navigated and selected/displayed on the VOD platform for viewing on home TV. Automatic navigation, selection and display is enabled by adopting the same EPG hierarchical addressing scheme used for the VOD program guide as the addressing metadata identifying content uploaded on the Internet. When an author or publisher connects to the Web-based Content Management System 40, the author or publisher selects the category term, subcategory term(s) and title by which it is desired to find the program title in the TV EPG display hierarchy. Thus, when the above-mentioned example of a video program is uploaded, the hierarchical address for that program would be selected as:

TV:/News/Anywhere Reporting/New York/Financial/"Live from NYSE by Jim Cramer".

This hierarchical addressing metadata is associated with or tagged to the content when uploaded to the Web-based Content Management System 40, and is carried over into the VOD/EPG navigation scheme displayed on the TV. By carrying over the hierarchical address metadata into EPG navigation, the invention allows the content to be automatically listed in the EPG under the common addressing scheme to enable viewers to find any program of interest. The hierarchical addressing string of terms resembles URL addressing commonly used on the Internet. Thus, Internet users can readily become familiar with finding TV programs on the VOD EPG guide due to its resemblance to finding web resources with a URL. Indeed, in the convergence of Internet and TV worlds, a TV EPG hierarchical address may be thought of as a URL for a TV program.

The uploaded content is converted, as previously described, into a standard TV digital format, and a "local instance" thereof is stored at an assigned VID address in the Video Content Database 45 of the VOD platform. The VID address is linked to the metadata title for the video content listed in the EPG. The hierarchical address for the title is automatically carried over into the EPG navigation scheme, and can be found by a viewer cursoring (with the TV remote control) through the EPG following the same hierarchical addressing sequence. Upon the subscriber selecting, via a remote control unit in communication with the set-top box, the title of the video content from the hierarchically-arranged categories and subcategories in the EPG, a return request for the selected title is transmitted to the VOD platform for retrieving the video content at the linked VID address in the Video Content Database. The requested video program is then retrieved and transmitted by the VOD Content Delivery System 44 through the digital TV lines to the subscriber's set-top box for display on the subscriber's TV.

By the method of the present invention, the title and hierarchical address assigned by the publisher of the program is automatically carried over into the TV electronic program guide (EPG) following the same hierarchical addressing indicated by the publisher of the content. The publisher selects categories and subcategories for categorizing the title of the video content from the EPG categorization scheme presented by the digital television service provider for the listing of titles on one of its VOD channels. With this method, vast numbers of content publishers anywhere on the Internet can upload their programs with a minimum of conversion and handling steps by the digital television service provider. Home TV viewers can then easily use the EPG hierarchical navigation scheme to find something of interest for viewing.

Digital TV service providers can thus greatly expand the content viewable on the VOD platform from studio-generated programs and canned advertisements to an infinite universe of authors and publishers connected to upload viewable content to their system via the Internet. For example, local content can be created and published by people in a service area's local community—its independent filmmakers, its college students and professors, its civic leaders and others—to provide programming for TV. Providing a vehicle for "citizen content" or "citizen journalism" to be seen on TV is expected to tap into the boundless resourcefulness and creativity of the TV audience itself and enable nonprofessionals to become part of the TV content-creating process. Such citizen content creators and journalists can create content that would otherwise not rise to the level of interest for studios to create programs for them or be overlooked by larger media outlets.

While it may take time for the TV-viewing public to become comfortable with searching for and viewing programs from a plethora of new nonprofessional content, an intermediate stage of demand for nonprofessional content from wide new audiences are the so-called blogging or podcasting programs that have become popular on the Internet or by Internet downloading. Such programs are typically created by an author or publisher that has already achieved popular recognition through word-of-mouth or user rave reviews. The equivalent to the blogger or podcaster on the Internet is the "host" or "celebrity" on the TV. The Host provides a recognized face on TV and is relied upon by his/her audience to provide trusted commentary as a filter, reviewer, rater, and/or analyst of information of value. In the present invention, TV programs created by whole new cadres of non-studio or non-network Hosts and other "self-publishers" can be uploaded via Internet for viewing on TV.

Figure 5:
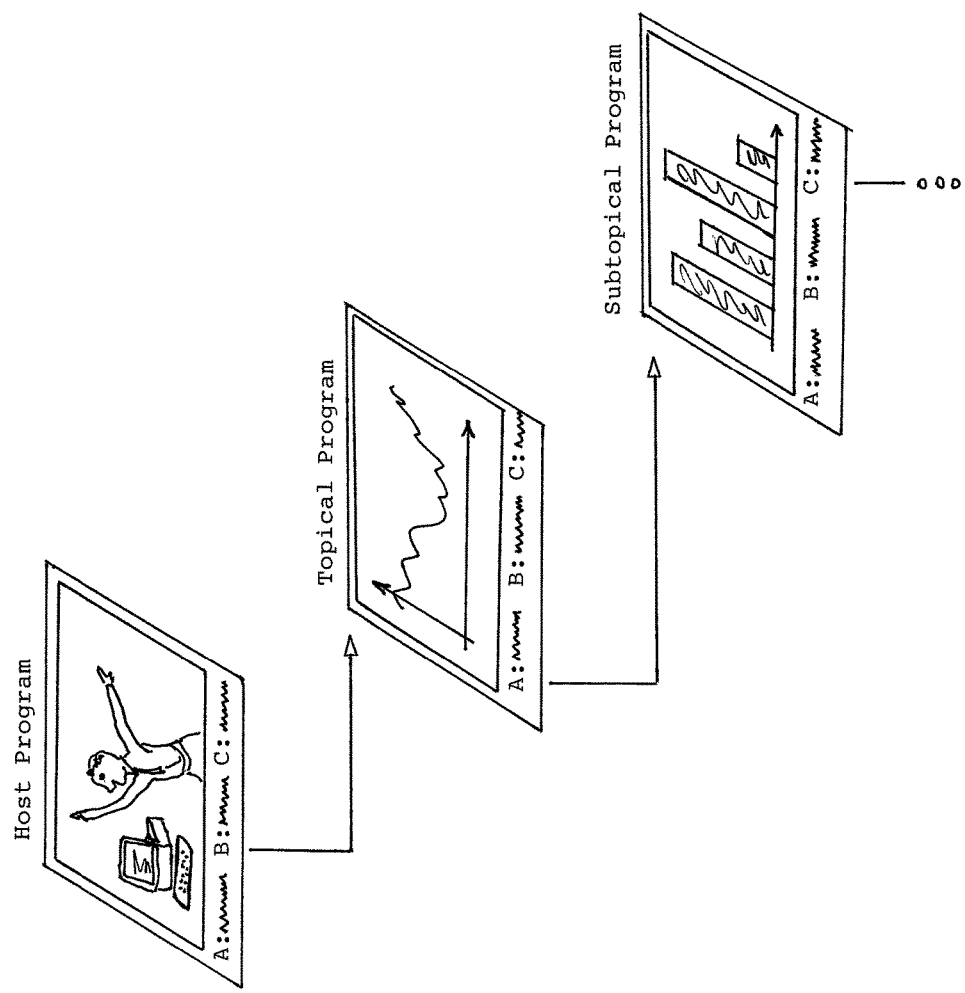
FIG. 5 is a diagram illustrating an example of a blogging or podcasting-like program presented by a "Host" with layered topics and links to other programs.

Besides a single video segment, an uploaded program may instead be layered in successive hierarchies of segments that can provide viewers with a "drill-down" experience similar to the "drill-down" video ad immersion experience described previously. For example, in FIG. 5, a hosted video blog show has a Host in a presentation segment (topmost in hierarchy) presenting a topic, such as "Live from NYSE, by Jim Cramer". The Host can then direct viewers to click on an on-screen menu of choices to select more detailed topical segments, for example, Key "A" for "S&P 500", Key "B" for "NASDAQ", and Key "C" for "Commodities Markets". Upon clicking on Key "B" for "NASDAQ", the VOD system retrieves the video segment "/Live from NYSE by Jim Cramer/NASDAQ" and displays that video segment to the viewer. The topical segment may have other layers of subtopical segments, for example, Key "A" for "/Feature: Apple Computer", Key "B" for "/Feature: Google", and Key "C" for "/Feature: Microsoft", and so on. As a preferred mode of implementation, the hierarchical video segments are presented and linked in templatized VOD displays, as previously described with respect to FIG. 1C, with the menu of options displayed as buttons on the template frame. In the same manner, the Host can also serve to link the viewer to other Host programs or other VOD-listed programs by an on-screen menu of options selectable by keys on the remote control unit.

As an added feature, the above-described VOD EPG with titles categorized in the hierarchical addressing scheme of categories and subcategories can be configured to enable a viewer to store bookmarks for desired VOD-listed TV programs for viewing again or sharing with friends. FIG. 6 is a diagram illustrating the logic flow for using an EPG to enable a viewer to store TV bookmarks for desired VOD-listed TV programs. In Step 601, the viewer selects (highlights) a video content title in the EPG to be bookmarked and enters the key for the on-screen option "Store Bookmarks". In Step 602, a prompt requests the viewer to enter a previously registered Personal Identification Number (PIN) identifying that user, and upon the user entering the PIN number and pressing the "Select" or "Enter" key, the VOD system checks to validate the user's PIN with the registered users for that set top box address.

Upon validating the user, in Step 603, a menu of options is displayed, from which the viewer can select "Bookmark it now". Other options include B: "Send TV Friend, C: "Related Programs", and D: "Bibliographic Information". Option B: "Send TV Friend is discussed further below. Option C: "Related Programs" is an option where the VOD system can suggest titles related to the one highlighted by the viewer for browsing for further interest. Option D: "Bibliographic Information" allows the viewer to read background information on the highlighted title. Upon bookmarking, in Step 604, the VOD system confirms the bookmark by displaying the latest bookmarked title at the top of the list of bookmarked titles entered by the user. Other options are presented for the viewer to manage the list of bookmarks, such as A: "Play", B: "Delete", C: "Clear All", D: "Send to Net" (described further below).

Figure 7:
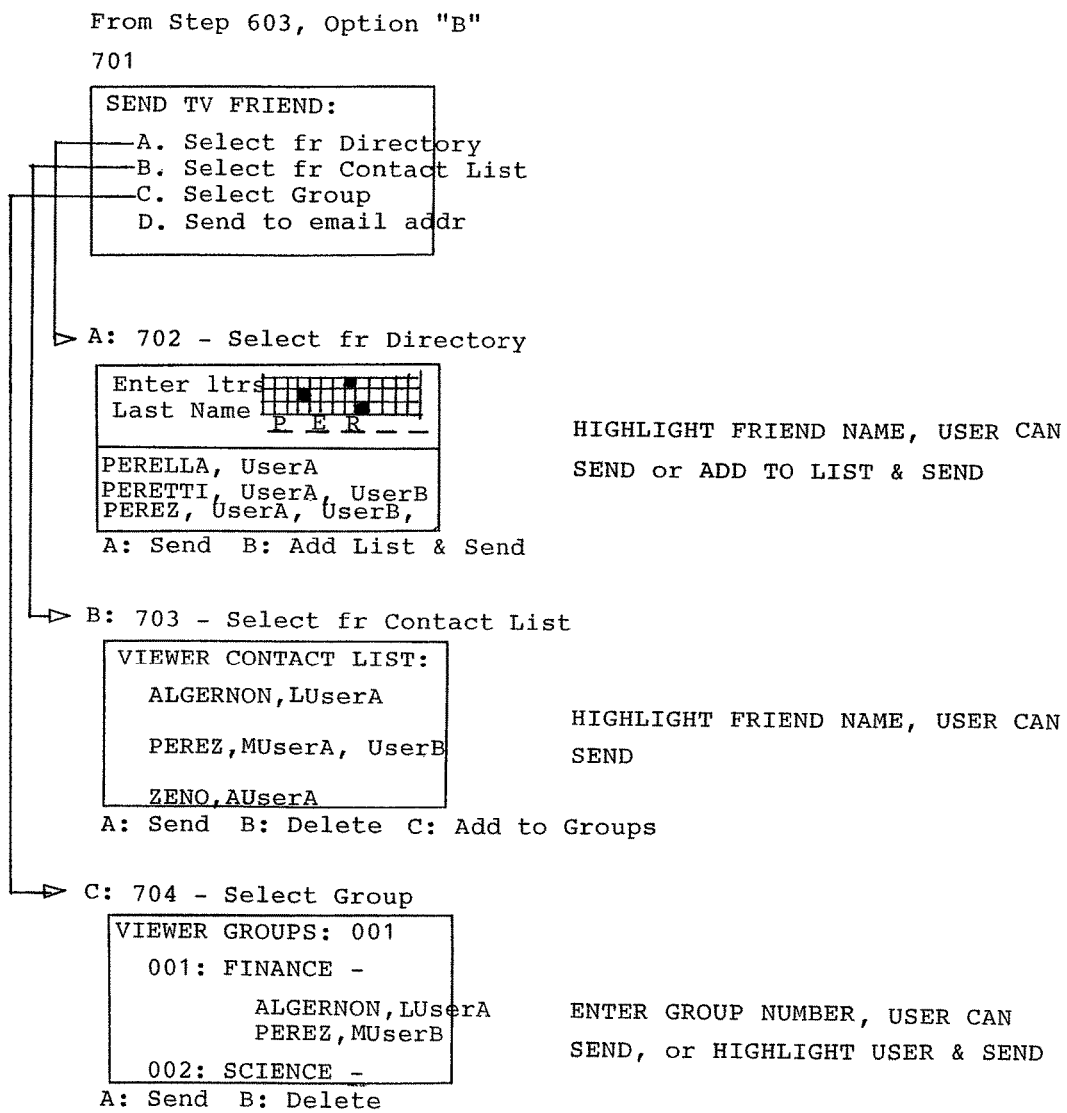
FIG. 7 is a diagram illustrating an example of sharing TV bookmarks with other TV subscribers via an on-screen Contact List maintained for the viewer.

In order to provide functionality to share video programs with a friend, the VOD system can also enable a viewer to share bookmarks with a friend who is also a TV subscriber in the same service area of the digital TV service provider. FIG. 7 is a diagram illustrating an example of sharing TV bookmarks with other subscribers via an on-screen Contact List maintained for the viewer. In Step 603 of FIG. 6, the viewer can select option "B" to "Send TV Friend", and the VOD system in Step 701 displays options for selecting the viewer's TV friends to receive bookmarks, including A: Select from directory, B: Select from Contact List returns, and C: Select Group.

If option "A" in Step 701 is selected, the VOD system displays in Step 702 a directory of subscriber names in that service area which can be scrolled through using an on-screen keyboard to input the beginning letters of last names. Upon the viewer entering the beginning letters of a last name, the directory jumps to the section listing those names and shows the first names or User ID names for any previously registered "User A", "User B", etc., for the bookmarking service. The viewer can then select the other TV subscriber the bookmark is to be sent to, and then click option A: "Send" or B: "Add to List & Send". In option "B", the highlighted name is automatically added to the viewer's Contact List (see following). If option "B" in Step 701 was selected, the VOD system displays in Step 703 an alphabetical Contact List of subscriber names/users previously entered (or automatically added by sending) by the viewer. The viewer can highlight the friend's name/user, and click A: "Send". Other options include B: "Delete" and C: "Add to Groups". If option "C" in Step 701 was selected, the VOD system displays in Step 704 a listing of Groups (by number) having individual names/users previously entered by the viewer.

As a further TV-controlled functionality to share video programs with a friend, the VOD system can also enable a viewer to share bookmarks with other friends and contacts on the Internet. This requires traversing the boundary between the digital TV service and the Internet. FIG. 8 is a diagram illustrating an example of sharing TV bookmarks with others online by transmission of bookmark data to the viewer's email address. If the viewer selected option "D" in Step 701 of FIG. 7, the VOD system displays a list of previously entered email addresses entered for the subscriber household, and also an input box for a new or changed email address. Upon highlighting or entering the intended email recipient and clicking "Send" in Step 801, the request from the viewer's set top box is returned to the Digital TV System and routed to the Web-based Content Management System 40 or other web-based server with Internet connectivity for sending the TV bookmark(s) to the indicated email address which is received and accessed on the recipient's PC or other email-enabled device.

Going from Internet to the TV, in Step 802, a PC user can share TV bookmarks received by email on the PC with other contacts and friends whose email addresses are maintained in an address book or contact list on that person's email client. The PC user can also send TV bookmarks found in searching a website for program listings offered by the Digital TV System to their own Viewer Bookmarks file(s) or to those of other TV subscribers. The PC user simply logs on via Internet to the Web-based Content Management Server 40 for the Digital TV System and selects an option to send the TV bookmark(s) to the Viewer's Bookmark file(s) 604 for that person's subscriber name/user, or to the name/user of any other TV subscriber.

The capability for Internet uploading and automatic listing in any VOD EPG opens VOD programming in digital TV systems to greatly expanded audiences of non-studio, non-professional video authors and publishers. The new publishers also become new viewers, reviewers, commentators, and celebrities to accelerate the "network effect" of expanded viewing on TV. The digital TV service provider can charge smaller but greatly multiplied VOD program placement fees to the new audiences of non-studio, non-professional video authors and publishers. Programs that rise above the crowd due to popularity may attract advertising and sponsorships placements that provide additional revenues for the digital TV service provider and the publisher. With future expansion of VOD "channel" capacity, the system can be opened to broad masses of "citizen" publishers. Popular "blogs", "themes", "social networks", or "knowledge networks" created on VOD channels may attract advertising and sponsorships to the digital TV service provider. The placement fees charged for the broad masses of other programs may be reduced or enhanced by "carve backs" funded by automatic digital ad insertions or "pre-rolls" inserted before the program and paid to the publisher. The digital TV service provider can provide value-added services to publishers justifying program placement fees or revenue-sharing of paid advertising by maintaining "dynamic accounts" for publishers tracking number of views, popularity, length of placement, paid advertising spots, carve back payments, etc. Expanded VOD viewing also can generate additional revenue streams for the digital TV service provider from viewers through gigabyte download fees or by "Premium (VOD) Services" (upper viewer tier) fees.

The extension of TV VOD programming to citizen publishing, and the convergence of Internet searching with sharing of TV program bookmarks, can also stimulate diverse new content publishing sources and supporting hardware and equipment in the converged Internet-TV universe. For example, TV EPGs can be exported to via Internet to Internet-connected digital devices, including digital phones, media players, game consoles, Video iPods™, PDAs, etc., and conversely, TV bookmarks selected from EPGs on the Internet can be imported back into the viewer's "MyEPG" or "MyVideoLibrary" for their TV through the Web-based Content Management System. This would enable people to freely select, save, bookmark, and share TV programs with friends and contacts between their TV viewing environment and their daily mobile or away-from-home environments. Internet-connected DVRs, such as those sold by TiVo, or virtual DVRs offered by the digital TV service provider can also connect Internet searching and bookmark sharing to the viewer's "MyEPG" or "MyVideoLibrary" for VOD program viewing.

In the above description, a VOD "channel" is a term commonly used for the mechanism by which users access and view VOD content. "Channel" historically refers to linear broadcast channels, and VOD by definition is a non-linear, on-demand experience. When a user accesses a VOD "channel" on a digital television system, they are accessing a digital "virtual channel", where the tuning of the channel number triggers the digital set top box to load and execute an interactive application that is presented on the television. This application will present the categories, subcategories and titles of VOD content that is available for viewing. The user navigates through the application using the remote control, traversing the hierarchy used to organize the VOD content. When the user selects a VOD title for playback, the digital VOD content is transmitted from a VOD server to the set top box using a dedicated data stream. The actual mechanisms for transmission vary for different digital television system technologies, but in all cases the stream is unicast to the specific set top box. The set top box receives and decodes the data stream and presents the VOD content on the television. A digital television system can support many VOD "channels", where each "channel" is an interactive application that offers VOD content that has been grouped together by topic, sponsor, content producer or other attributes. As available bandwidth increases in digital television systems, there will be an increase in quantity of the VOD "channels" available to the user, as content producers migrate from the linear broadcast format to the non-linear on-demand format. Correspondingly, as the processing power of set top boxes increases, combined with greater network bandwidth, the sophistication of the interactive applications supporting VOD "channels" will increase, offering enhanced ways for interacting with the content and the producer, as well as offer related content and materials, transactions and other methods for engaging the user more completely with the content.

It is understood that many modifications and variations may be devised given the above description of the principles of the invention. It is intended that all such modifications and variations be considered as within the spirit and scope of this invention, as defined in the following claims.

The invention claimed is:

1. A method, comprising:
(a) providing, to an Internet-connected digital device, a viewer interface application configured to receive video-on-demand program content;
(b) receiving, at a television service platform from the Internet-connected digital device, login credentials;
(c) verifying, by the television service platform, that the login credentials are associated with a registered user account;
(d) transmitting, to the Internet-connected digital device, an electronic authorization for the viewer interface application to access privileges associated with the registered user account;
(e) transmitting, from the television service platform via a broadband connection to the viewer interface application on the Internet-connected digital device associated with a subscriber, an electronic notification of the availability of a new video-on-demand program content for viewing by the subscriber, wherein the electronic notification is to be displayed by the viewer interface application in a list of one or more available video-on-demand program content in a menu of an electronic program guide on a display for the Internet-connected digital device and wherein the electronic notification of the availability of the video-on-demand program content for viewing by the subscriber is transmitted, by the television service platform, in response to receipt of an electronic bookmark at the television service platform sent from a cable tuner to the television service platform; and
(f) receiving, at the television service platform via the broadband connection, a request from the Internet-connected digital device to access the video-on-demand program content in response to a selection in the viewer interface application via the Internet-connected digital device of an item on the list; and
(g) transmitting, via the broadband connection to the viewer interface application on the Internet-connected digital device, the video-on-demand program content for playback on demand.

2. The method of claim 1, wherein the login credentials comprise an account name and a password.

3. The method of claim 1, wherein the electronic notification of the availability of the video-on-demand program content for viewing by the subscriber is transmitted, by the television service platform, in response to receipt of an electronic bookmark at the television service platform sent from a second Internet-connected digital device.

4. The method of claim 3, wherein the video-on-demand program content has been uploaded to the television service platform from a citizen content publisher associated with the second Internet-connected digital device to be sent to the Internet-connected digital device associated with the subscriber.

5. A method, comprising:
(a) providing, to an Internet-connected digital device, a viewer interface application configured to receive video-on-demand program content;
(b) receiving, at a television service platform from the Internet-connected digital device, login credentials;
(c) verifying, by the television service platform, that the login credentials are associated with a registered user account;
(d) transmitting, to the Internet-connected digital device, an electronic authorization for the viewer interface application to access privileges associated with the registered user account;

(e) transmitting, from the television service platform via a broadband connection to the viewer interface application on the Internet-connected digital device associated with a subscriber, an electronic notification of the availability of a suggested video-on-demand program content for viewing by the subscriber, wherein the electronic notification is to be displayed by the viewer interface application in a list of one or more available video-on-demand program content in a menu of an electronic program guide on a display for the Internet-connected digital device and wherein the electronic notification of the availability of the video-on-demand program content for viewing by the subscriber is transmitted, by the television service platform, in response to receipt of an electronic bookmark at the television service platform sent from a cable tuner to the television service platform; and (f) receiving, at the television service platform via the broadband connection, a request from the Internet-connected digital device to access the video-on-demand program content in response to a selection in the viewer interface application via the Internet-connected digital device of an item on the list; and (g) transmitting, via the broadband connection to the viewer interface application on the Internet-connected digital device, the video-on-demand program content for playback on demand.

6. The method of claim 5, wherein the login credentials comprise an account name and a password.

7. The method of claim 5, wherein the electronic notification of the availability of the video-on-demand program content for viewing by the subscriber is transmitted, by the television service platform, in response to receipt of an electronic bookmark at the television service platform sent from a second Internet-connected digital device.

8. The method of claim 7, wherein the video-on-demand program content has been uploaded to the television service platform from a citizen content publisher associated with the second Internet-connected digital device to be sent to the Internet-connected digital device associated with the subscriber.

* * * * *